United States Patent
Lee et al.

(10) Patent No.: US 11,928,745 B2
(45) Date of Patent: *Mar. 12, 2024

(54) ISSUE MANAGEMENT SYSTEM

(71) Applicant: Bank of Montreal, Toronto (CA)

(72) Inventors: Duane Lee, Toronto (CA); Emily Cox, East York (CA)

(73) Assignee: BANK OF MONTREAL, Toronto (CA)

(*) Notice: Subject to any disclaimer, the term of this patent is extended or adjusted under 35 U.S.C. 154(b) by 95 days.

This patent is subject to a terminal disclaimer.

(21) Appl. No.: 17/688,594

(22) Filed: Mar. 7, 2022

(65) Prior Publication Data

US 2022/0198580 A1    Jun. 23, 2022

Related U.S. Application Data

(63) Continuation of application No. 16/442,104, filed on Jun. 14, 2019, now Pat. No. 11,270,389.

(60) Provisional application No. 62/685,591, filed on Jun. 15, 2018.

(51) Int. Cl.
G06Q 40/00 (2023.01)
G06F 16/20 (2019.01)
G06F 16/23 (2019.01)
G06N 20/00 (2019.01)
G06Q 40/12 (2023.01)

(52) U.S. Cl.
CPC ........ *G06Q 40/12* (2013.12); *G06F 16/2365* (2019.01); *G06N 20/00* (2019.01)

(58) Field of Classification Search
CPC ..... G06Q 40/12; G06N 20/00; G06F 16/2365
See application file for complete search history.

(56) References Cited

U.S. PATENT DOCUMENTS

| 9,747,598 B2* | 8/2017 | Mogollon | G06Q 30/06 |
| 10,146,792 B1* | 12/2018 | Dobrek | H04L 9/32 |
| 11,182,547 B2* | 11/2021 | Gandhi | G06F 3/048 |
| 11,270,389 B2* | 3/2022 | Lee | G06Q 40/12 |

* cited by examiner

*Primary Examiner* — Paul Danneman
(74) *Attorney, Agent, or Firm* — FOLEY & LARDNER LLP

(57) ABSTRACT

A new issue management (NIMS) platform configured to track and report on New Issue data and generate visual elements, alerts and reports for interface applications. The NIMS platform provides a data capture and normalization solution. The NIMS platform can streamline data capture and dissemination processes and procedures by reducing duplicative data entry and manual input. The NIMS platform can improve data consistency by establishing automated systems across various lines of business for an organization. The NIMS platform can implement data capture, remediation and migration of current and historical data.

20 Claims, 22 Drawing Sheets

BMO Capital Markets      Debt Capital Markets | Canada

DCM Syndicate Update: New Issue      06/11/2018

| Field | Value |
|---|---|
| Issuer: | |
| Issue: | |
| Offering: | |
| Price: | |
| Size: | $390,000,000 |
| Coupon: | 3.250 % |
| Maturity Date: | Jun 02, 2062 |
| Yield: | |
| Spread: | |
| Benchmark: | 4.00% 01-JUN-41 |
| Redemption: | |
| Ratings: | S&P: AA-<br>DBRS: AA(low)<br>Moody's: Aa2 |
| Syndicate: | National Bank Financial Inc. (100.0 %) / |
| Jurisdictions Filed: | All provinces and territories of Canada. |
| Commission: | 0.000 % Retail<br>0.300 % Institutional |
| Settlement: | Nov 06, 2012 |
| Comments: | 1.<br>2.<br>3. |

1200

Debt Capital Markets Team

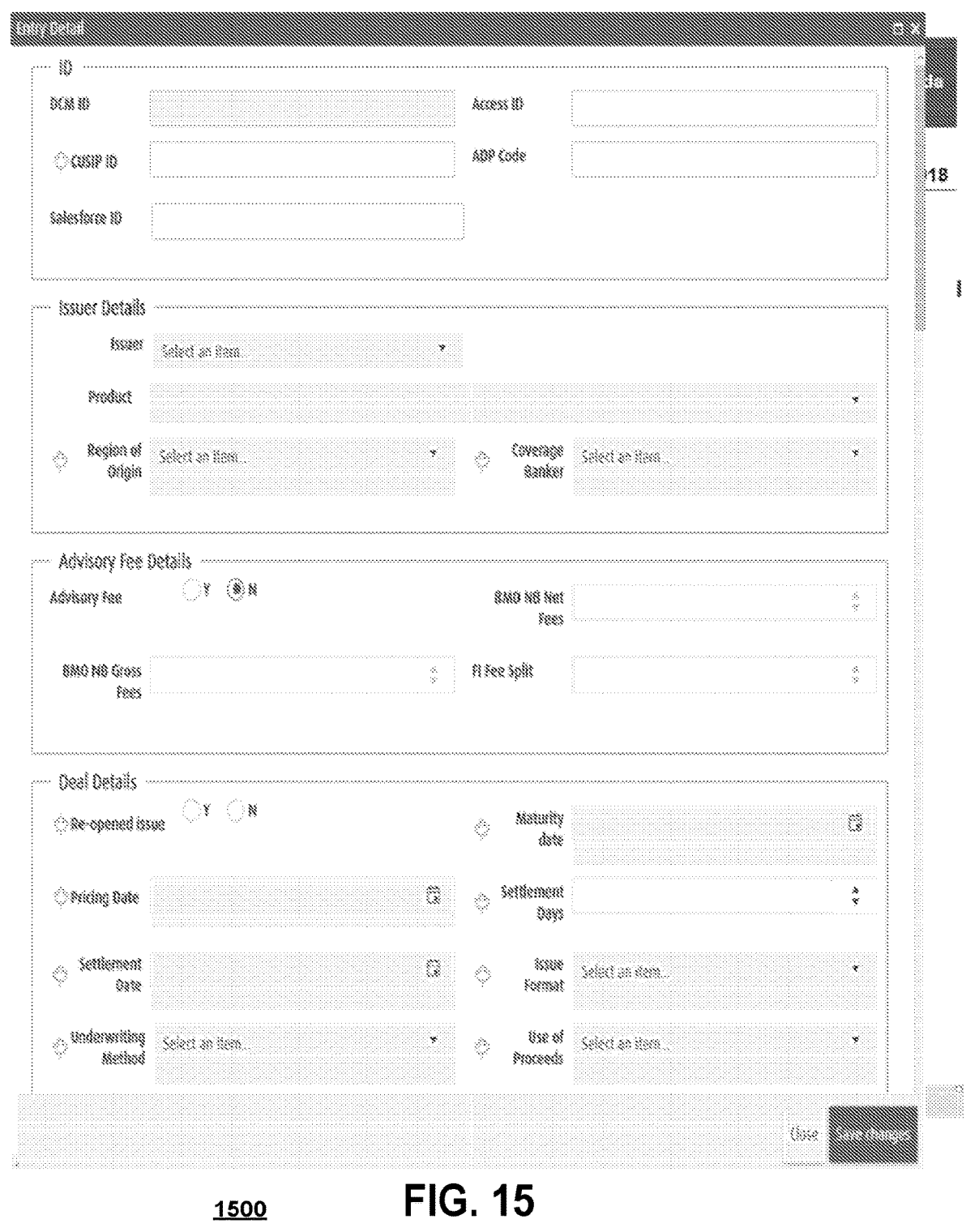

ISSUE MANAGEMENT SYSTEM

CROSS-REFERENCE TO RELATED APPLICATIONS

The present application is a continuation of U.S. patent application Ser. No. 16/442,104, filed Jun. 14, 2019, which claims priority to U.S. Provisional Patent Application No. 62/685,591, filed Jun. 15, 2018, all of which are incorporated herein by reference in their entirety for all purposes.

FIELD

The present disclosure generally relates to the field of automated process models, data normalization, and computer interfaces.

INTRODUCTION

Embodiments described herein relate to a new issue management system. Tracking issue data is manual and error prone. This can result in duplicative entries and manual calculations and input causing inefficient use of time and inconsistent reporting data. Data may be in different formats and locations and may not be useable for a computing system.

SUMMARY

In accordance with an aspect, there is provided a new issue management system. The system has a data storage device for storing data models, process models, machine executable instructions. The system has a processor configured by the machine executable instructions to: process input data to generate data entries using a mapping generated based on the data models, the input data having structured data and unstructured data, the data entries including pricing data; validate the data entries using an audit tool; store the data entries in the data storage device; generate a dynamic form for a new issue deal entry, the dynamic form having form fields automatically populated by a set of data entries of the generated data entries using the mapping; generate and transmit a new deal alert to a plurality of stakeholders, the new deal alert indicating that a new issue is live; provide, at an interface application, remote access by the plurality of stakeholders to the dynamic form for the new issue deal entry to receive additional data, the remote access based on security parameters; process the additional data to generate additional data entries using the mapping; validate the additional data entries using the audit tool; store the additional data entries in the data storage device; populate the dynamic form field with the additional data entries using the mapping; and generate and transmit an update alert including a report of the additional data entries for the new issue The new issue management system can include a master unit programmed with functionality that is common to more than one line of business which would also provide the ability to view or analyze data at the interface application within and across different lines of businesses or modules.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

FIG. 5 is a flowchart diagram of a process for client data validation.

FIG. 6 is a flowchart diagram of a process for client data validation.

FIG. 12 is a diagram of an interface for an example deal report.

FIG. 15 is a diagram of an interface for a deal entry page.

FIG. 17 is a diagram of an interface for a mapping page to add a new mapping.

DETAILED DESCRIPTION

Embodiments of methods, systems, and apparatus are described through reference to the drawings.

Figure 1A:
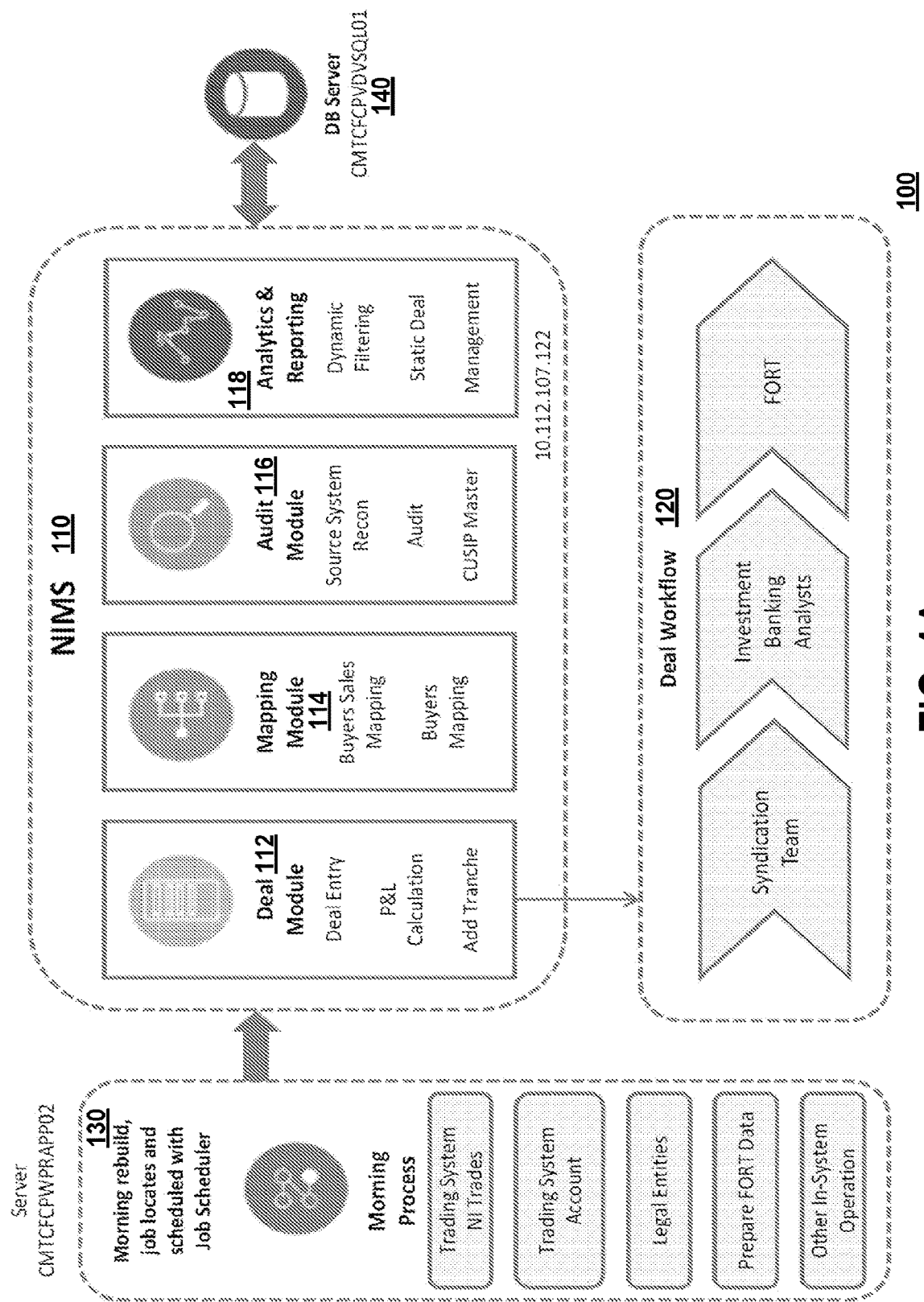
FIG. 1A is a schematic diagram of a new issue management platform according to some embodiments.

FIG. 1A is a schematic diagram of a system 100 with a new issue management (NIMS) platform 110 according to some embodiments. A new issue can refer to a security that has been registered and issued and is being sold on a market to the public for the first time. Specifically, in the equities market there are initial public offerings (IPOs) and secondary offerings of an equity security. Bonds can be issued for the first time, re-opened, or have a new tranche of bonds issued. For the NIMS platform 110, the origination of a loan or other indebtedness can be considered a new issue. The NIMS platform 110 can track and report on new issue data and dynamically generate visual elements, alerts and reports for interface applications. The NIMS platform 110 provides a data capture and normalization solution. The NIMS platform 110 can streamline data capture and dissemination processes and procedures by reducing duplicative data entry and manual input. The NIMS platform 110 can improve data consistency by establishing automated systems across various lines of business for an organization. The NIMS platform 110 can implement data capture, remediation and migration of current and historical data.

The NIMS platform 110 can have a data model and automated process model. A deal or new issue can involve data from a variety of sources and the NIMS platform 110 can automatically manage this data. The NIMS platform 110 can automate the deal origination process. When a deal or new issue is live then different stakeholders can use the NIMS platform 110 to access data and perform operations relating to the deal or new issue. Internal and external (lawyers, accountants, due diligence experts, etc.) stakeholders can leverage blockchain technology and smart contracts to automate the end to end process to manage and settle a transaction. For example, a transaction can involve the issuance of a bond (or note or other fixed income security) with participants in the syndicate for NIMS platform 100 to manage the issuance process between the issuer and the syndicate to digitize bond information on a blockchain network and replace extant ledgers and databases shared by all participants in the network.

The NIMS platform 110 can enable remote stakeholders to access new issue data and trigger different operations. The NIMS platform 110 stores the data after validating the data to ensure data integrity. The NIMS platform 110 provides a central access for data as well as central process controls. The NIMS platform 110 transmits alerts through the stakeholder network to provide updated reports. As data is added and validated the NIMS platform 110 can generate alerts with updated reports for transmission to stakeholders. Different data models can be used to trigger alerts and control operations. For example, a exposures and limits model can be used to calculate stress or loss factors associated with a deal. Parameters can be used to limit how much loss can be taken by committing to different deals. The model can compute the stress factor values and compare these values to stress or risk limits. This limits the number of deals that a broker can commit to doing. The calculated metric tries to determine how much risk is associated with committing to the deal. Another example model relates to assets. The deal may need to be funded with capital and when committing to the deal then capital must be set aside as a reserve on the balance sheet. The models can be used to trigger alerts. For example if a broker is looking at a particular deal that an alert can be sent if committing to the deal will exceed a risk limit. Data models can be used to define mappings between data entries.

The following are example data models:
UW Stress: Value-at-Risk methodology based model that calculates the expected loss on an underwriting position based on deal terms, market rates, and worst case scenarios
UW Exposures: Model that manages the portfolio of deals and associated deal stress amounts in aggregate. Provides reporting and analytics on limit utilization, portfolio optimization, and hedging
UW RWA: Regulatory driven Value-at-Risk methodology based model that calculates the regulatory capital requirements on an underwriting position based on deal terms, market rates, and scenarios Data can be collected through multiple processes, systems and regulatory regimes. To leverage data for analytics, management, and regulatory reporting the NIMS platform 110 can validate, associate and enhance the client data using normalization or validation processes. The NIMS platform 110 can provide a true accountability structure for data for different groups responsible for stewarding data. For example, the Front Office can be responsible for client coverage and enablement activities, in addition to business acceptance of data and reporting risks. There can be visibility of client identity relating to activity. As another example, middle office is responsible for security and transaction level data quality, processes, and regulatory reporting. As a further example, back office is responsible for transaction system data and maintenance of client accounts. The NIMS platform 110 can create and store data and can also check other systems with relevant data to validate the data. When the Nims platform 110 creates data it triggers an investigation process. The platform 110 checks other data sources for data alignment to ensure data is consistent across the different data sources the platform 110 also checks for the quality of data in a specific system using a ranking process. The platform 110 generates an investigation response and stores the response. If there is a discrepancy in the data then the platform 110 can generate a view on an interface application that highlights the data flagged. The platform 110 can indicate in the view the source for the flagged and highlighted data. The platform 110 can show different sources of data so that the user can compare the different sources to adjudicate the discrepancy. The platform 110 visually aligns data for the different sources to ease the investigation process. The platform 110 ask a final determination for the data. The platform 110 maintains its own data store and also connects with other systems for continuous data alignment. Different stakeholders can access platform 110 to review any discrepancies flagged and provided in the form of a report in an alert.

The platform 110 stores data regarding the quality of the data sources and risk levels for using data from the different sources. The platform 110 creates data and communicates with other systems to validate data. The platform 110 can make correction to align the values. Even if there may not be consensus the platform 110 can proceed with its data if there is a strong confidence that its data is correct (e.g. customer name likely to be most recent).

The NIMS platform 110 can validate data for accuracy and compliance with data models and regulatory requirements. The NIMS platform 110 can validate the association of client data with transactional, risk and credit data. The NIMS platform 110 can validate or associate both structured and unstructured data. Examples of structured data include length-delineated data such as client aliases, transaction or credit information, phone numbers, Social Security numbers, ZIP codes, and so on. Examples of unstructured data include text files, such as word processing, spreadsheets, presentations, email, logs, social media data such as data from social media networks, website data such as company pages, regulatory or industry sites, mobile data such as text messages, locations, communications data such as chat, instant messages, phone recordings, collaboration software, media data such as MP3, digital photos, audio files and video files, business application data such as documents, productivity applications, satellite imagery and map data, scientific data such as oil and gas exploration, space exploration, seismic imagery, atmospheric data, digital surveillance data such as surveillance photos and video, observed market data such as capital markets, indexes, and so on.

The NIMS platform 110 can associate client coverage and client contact information. The NIMS platform 110 can associate client activity and system and content enablement.

The NIMS platform 110 can enhance input data that has been appropriately validated and associated by creating actionable information and analysis to make better informed management information and client interactions.

The combination of these activities with regulatory, risk, and legal data models results in a holistic data view of who a client is with what clients have done. The NIMS platform 110 can use analytics and AI robotics to add actionable items and operations that can automate execution of a process or workflow and automate recommendations and predictions. The NIMS platform 110 can use AI robotics to generate predictive advice. The platform 110 can use a machine learning to flag unaligned data that can be displayed for user review. The machine learning can train on the different data sources and process metadata to understand the structure of data for the different data sources. Machine learning can automate the adjudication of flagged data. The platform 110 can flag differences between different data sources and display the different data into a view of an interface application for review. The data and the sources can be displayed in a matrix so that the user can compare the different sources as part of the adjudication.

For example, the NIMS platform 110 can use AI robotics to generate predictive advice for investors to identify bonds for sales and trading personnel to propose to investors based on their past participation in new issue transaction. The NIMS platform 110 can propose directly to investors through an investor portal.

For example, the NIMS platform 110 can use AI robotics to generate predictive advice for issuers to identify investment bankers when investors are likely to finance (can be through analysis of debt or loan maturities, financial statement analysis, or analysis of unstructured data, for example).

For example, the NIMS platform 110 can use AI robotics for operational logic (e.g. deal entry and processing). The NIMS platform 110 can have the ability to complete forms and documents based on deal details in real time.

For example, the NIMS platform 110 can implement Smart Contracts for the reduction of extant ledgers and databases from a dozen or more per firm to just one that is shared by all firms in a network The NIMS platform 110 can receive input data from server 130 from a period rebuild process with job locates and scheduled using a Job Scheduler. The server 130 onboard historical and external data to populate the NIMS platform 110. The input data can include data from different data sources such as trading systems, trades, accounts, sales, legal entities, in-system operations, and so on.

The NIMS platform 110 can process data using a deal tool 112, mapping tool 114, audit tool 116, report generator 118. The NIMS platform 110 can provide data to a database server 140 for storage and receive data from the database server 140 for processing.

The deal tool 112 can implement deal entry, profit and loss calculation, and add tranches. For example, for deal entry the deal tool 112 can generate a deal origination form to capture data related to a deal. The deal origination form can have multiple form fields. Each form field can have an attribute or type and an entry. The form field entries can be automatically populated based on templates and data mappings (e.g. using mapping tool 114). The deal tool 112 implements a workflow 120 for syndication devices, banking analyst devices, and front office reporting interfaces. Syndication is responsible for processing the deals, coordinating with the other syndicate members and selecting investors. Investment Banking Analysts are responsible for pricing, hedging, and other advanced deal aspects. FORT step is the process to prepare and send data and analytics to the public (investor) side of the business For example, the workflow 120 pulls and manages data for the deal from the NIMS platform 110 and database server 140.

Figure 16:
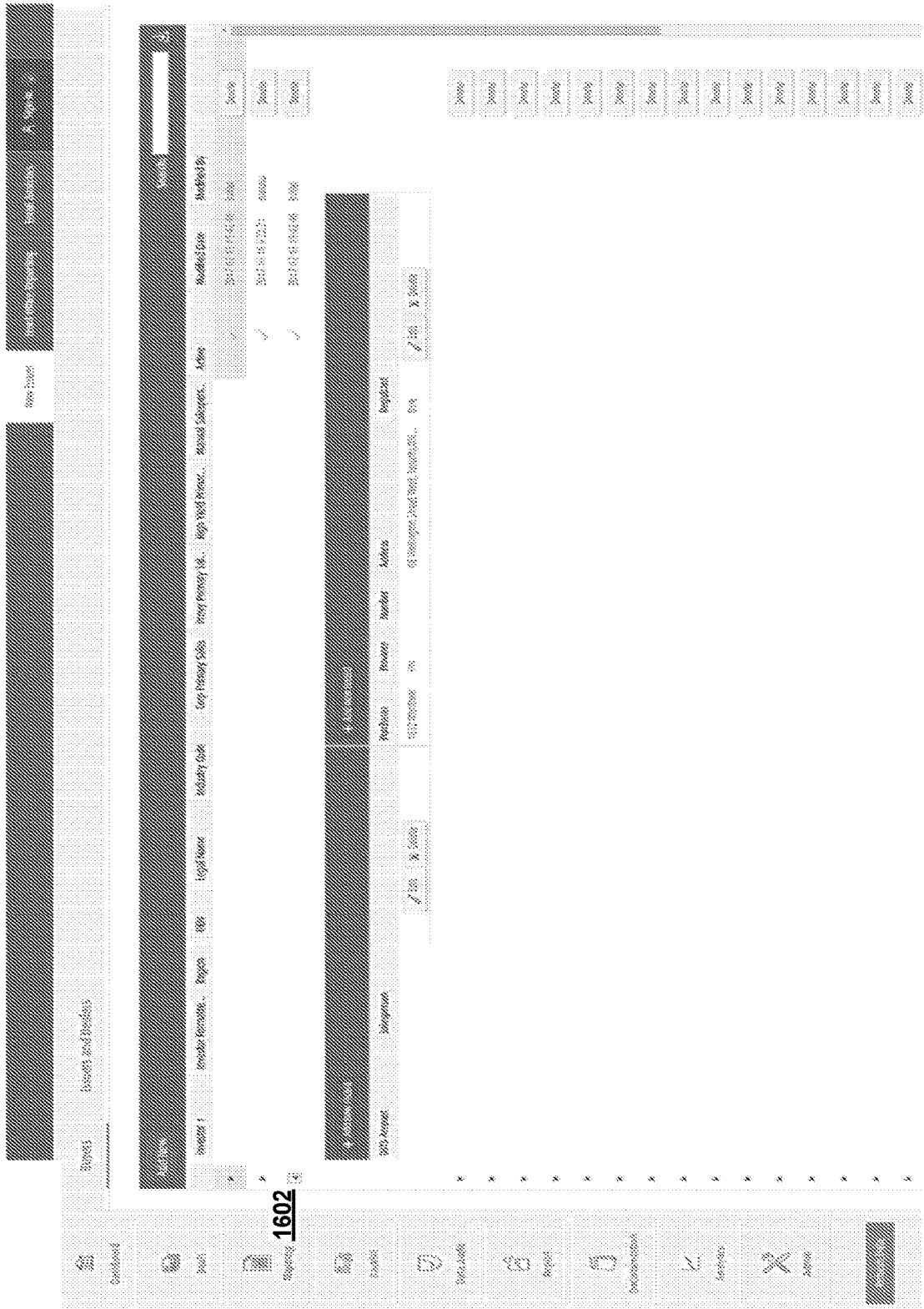
FIG. 16 is a diagram of an interface for a mapping page.

The mapping tool 114 can implement a data model for data mapping between entries and interface applications (e.g. page views with form fields). The mapping tool 114 can implement buyer sales mappings and buyers mappings, for example. The mapping tool 114 links data models and process models. The process models can control workflow 120, for example. The data models can link data entries to process models to automate data population, for example. The mapping tool 114 facilitates the aggregation of the various sources for easy viewing or association. The mapping tool 114 can use AI to compute probability matches and for use in collecting and associating external data. FIG. 16 shows an example interface for the alignment of buyer data from several unrelated or unmapped source systems. FIG. 17 shows an example interface for adding a new mapping entry. A mapping can link to name data entries for example. One name data entry can be an acronym for the name and the other name data entry can be the full name. Both data entries indicate the same thing but in different ways. It may be desirable to update the one name data entry so that it is the exact same as the other data entry. However there may be format constraints around how a name can be represented so that it cannot be changed. A mapping can be used to link the two data entries so that the system can treat them as the same even if the actual data values are different. Machine learning can review the different data sets to identify potential mappings between different data entries. The mappings can link different dimensions that relate to the data entry or value. In some instances, machine learning can automatically generate the mappings data entries. An update to one of the data entries can trigger an update to the other data entry using the mapping.

The audit tool 116 can implement verification and validation of the data by comparing data elements to validate entries. The audit tool 116 can implement reconciliation, and manage a master data store. The audit tool 116 can validate the data using different components. For example, the audit tool 116 can validate the data using case investigation. The investigation of cases involves a specific task being accurately scoped, assessed, and triaged. The analysis of the information provided on the case provides the key inputs required to perform the fundamental research (e.g. the who, what, when, where). The audit tool 116 can automate trade matching and error detection through machine learning. The audit tool 116 leverages internal books of record and external vendor data systems to validate the data. The audit tool 116 can trigger the visual display a flag data for adjudication. In some embodiments, machine learning can automate the adjudication of the flag data. The visual display can also indicate context information about the data such as at source or when it was created or updated. The view can display indicators for the data source for the unaligned data such as in a matrix highlighted to show the different values.

As another example, the audit tool 116 can validate the data using fundamental research. Once the case facts are understood and the scope of work defined, the audit tool 116 researches data sources to independently collect information on the case from internal sources (e.g. booking, credit or CRM systems) and external sources (e.g. public filings, subscription data, regulatory sources, etc.). The audit tool 116 can use machine learning to examine multiple un-related data sources and use machine learning to perform fundamental research tasks, especially for unstructured data. The audit tool 116 can use machine learning to automatically adjudicate flag data. The research task can leverage internal book of records and external vendor data systems.

As another example, the audit tool 116 can validate the data using data alignment (Internal Front, Middle, Back vs External regulatory, legal, public). Data elements are compared across sources and ranked by quality of information. Data that is inconsistent are investigated and escalated for decisioning. The audit tool 116 can use machine learning to examine multiple un-related data sources and use machine learning to perform fundamental research tasks, especially for unstructured data.

As a further example, the audit tool 116 can validate the data using business rules and logic. Escalated cases are evaluated using defined rules and logic such as regulatory information and legal documentation prevails over information with undocumented lineage. The audit tool 116 can use machine learning to examine multiple un-related data sources and perform fundamental research tasks, such as for unstructured data, for example.

As another example, the audit tool 116 can validate the data using risk probabilities and ranking. Data issues associated with escalated cases are evaluated using an established scoring of internal and external data sources combined with business judgement to arrive at a probability the data is incorrect. Finally, a risk ranking (validated, partially validated, un-validated) is assigned and compared with the use of the data to determine whether the risk and use of the data are commensurate or if an alert should be generated for remediation. The audit tool 116 can use machine learning to automate the process of assigning risk and also assign potential risk outcomes. The risk probabilities can be used to validate the data by giving an indication of how much risk is being assumed if there is an error in the data. That is there may be a risk assumed by relying on the data if it turns out to be inaccurate.

The NIMS platform 110 data follows a life cycle of validation, scheduled review cadence, and data aging or lineage process that continually adjusts the risk probabilities and ranking.

The report generator 118 automatically generates reports and analytics using templates and data models to generate visual elements for a dashboard at an interface application. The report generator 118 can use dynamic filtering using the data model. The report generator 118 can generate reports for deal management. See for example, FIGS. 7, 8, 9, 10, 11, and 12. The report generator 118 can determine insights from data collected from multiple internal and external systems. The report generator 118 can compute relationships between new issue data and secondary data for relevant accounts. The report generator 118 can generate report data for historical and real-time issuance data to identify top primary issue buyers, extract previous client issue allocations, identify top primary market buyers between specific time frames, search specific clients to determine types of products they are involved with and so on. The report can be an interactive graph with visual elements for the top buyers for a specific market shown proportional by volume. The report generator 118 can provide a synoptic analysis on a client's secondary market activity based on different market segments. The report generator 118 can generate visual elements for display on interface for client's secondary market activity on an industry to industry basis. The report generator 118 can generate visual elements for display on interface to compare trade activities on specific tickets relative to the client's secondary market activity in specific markets or industries. The report generator 118 can generate visual elements for display on interface to identify client activities in the secondary market between specific time frames. The report generator 118 can generate visual elements for display on interface to convert raw or compiled data into a presentable format which provides insights to aid decision making. The report data can relate to primary issue and secondary issue flow data shown in comparison, for example. The report generator 118 can generate visual elements for display on interface to present relationships of new issue allocations with secondary trading flows, which can rank clients on metrics such as secondary trade flow per amount of new issue allocated and provide insights into client allocations and secondary trade flow ratios for specific time frames. The report generator 118 can generate visual elements for display on interface to show comparison graphs for specific new issue allocations to client secondary flow. The report generator 118 can generate visual elements for display on interface to show impact and analysis from market data and internal sources, compare client flow to market flow ratios for specific time frames, analyze client secondary trade patterns to assess how reactive they are to market conditions, and so on. The report generator 118 can generate visual elements for display on interface to show performance for any index or market industry flow for specific time frames. The report generator 118 can generate visual elements for display on interface to show client secondary activity post new issue allocation to determine if client is dumping security, historical relationships and flag any major discrepancies on trade volume, retain a list of client contact information, and so on.

Figure 1B:
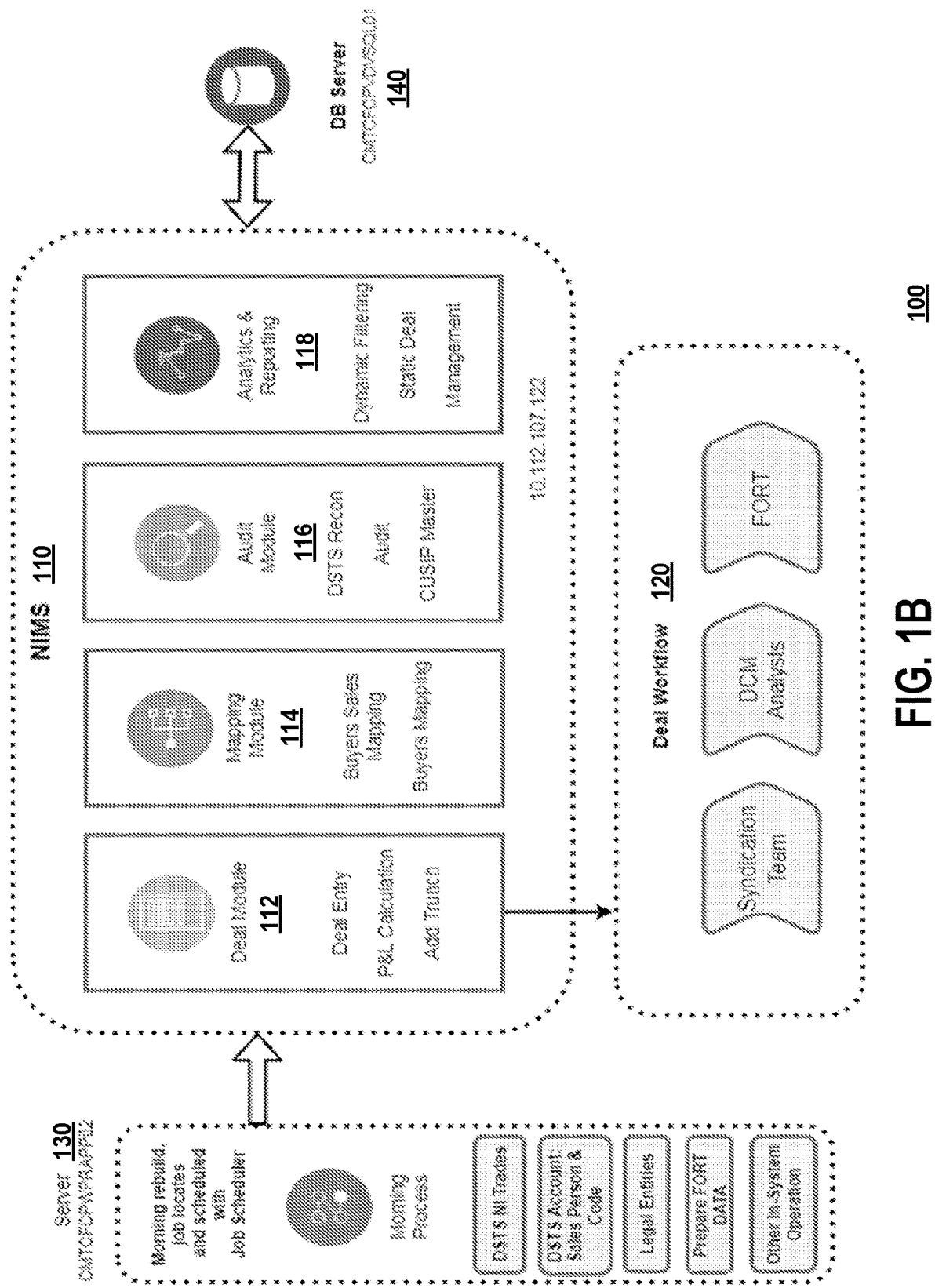
FIG. 1B is a schematic diagram of a new issue management platform according to some embodiments that relate to a capital markets use case.

FIG. 1B is a schematic diagram of a new issue management platform 100 according to some embodiments that relate to a capital markets use case. This is an example and the new issue management platform 100 can be used for different applications and lines of business.

Figure 2:
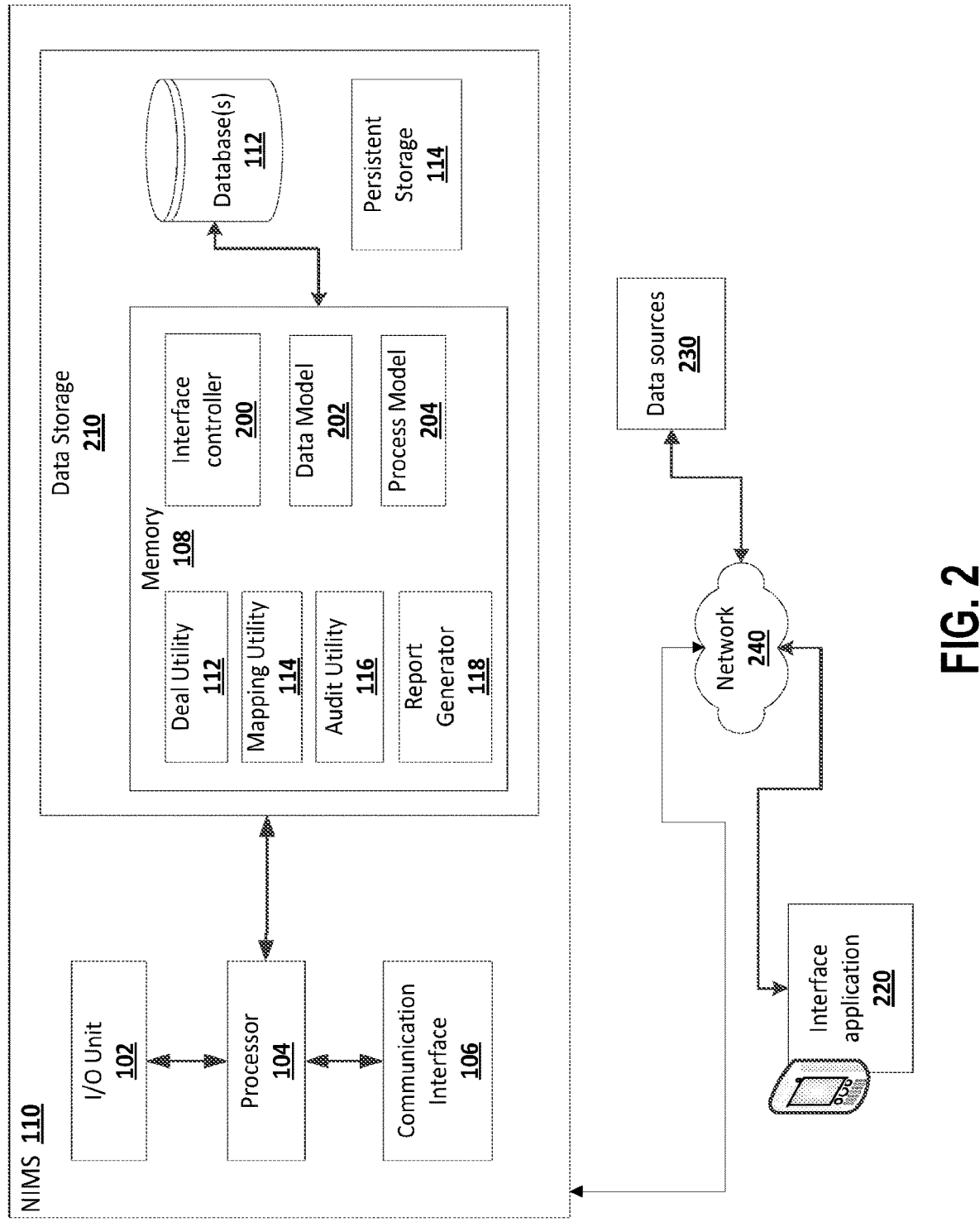
FIG. 2 is a schematic diagram of a new issue management platform according to some embodiments.

FIG. 2 shows a physical environment of the NIMS platform 110 according to some embodiments.

NIMS platform 110 can process input data to generate data entries using mappings generated based on the data models. The data models can be used to link data entries. The data models can be used to generate data and metrics. The input data can be structured data and/or unstructured data. NIMS platform 110 can manage the data entries across different data sources and the data can include pricing data; NIMS platform 110 validate the data entries using an audit tool 116. The validation can involve data comparisons against different data sources to check the accuracy and consistency of the data. Data can be received by NIMS platform 110 from different stakeholders in different formats. Validation enables data alignment across different sources. NIMS platform 110 can update or modify data flagged as being inconsistent or else override the flag and use its data for different operations and processes. NIMS platform 110 enables a network of remote stakeholders to access and update data and trigger other operations. NIMS platform 110 stores the data entries in the data storage device. NIMS platform 110 generates a dynamic form for a new issue deal entry. The dynamic form has form fields automatically populated by a set of data entries of the generated data entries using the mapping. NIMS platform 110 can automatically populate the forms using its stored data along with data access from disparate systems. This enables NIMS platform 110 to use a collection of data to automatically populate new issue deals. NIMS platform 110 can collect pricing data for the new issue, for example.

NIMS platform 110 can generate and transmit a new deal alert to the stakeholders. The new deal alert indicating that a new issue is live. NIMS platform 110 automatically generates and transmits alerts to a network of interested stakeholders. The alerts provides reports or summary data about the new issue. The report or summary data can be automatically gathered by NIMS platform 110 using its data and data accessed from other systems. NIMS platform 110 can provide, at an interface application 220, remote access by the stakeholders to the dynamic form for the new issue deal entry to receive additional data. The remote access based on security parameters. The security parameters can be at the application level and/or the data level to restrict access to sensitive data. NIMS platform 110 can process the additional data to generate additional data entries using the mapping. NIMS platform 110 can validate the additional data to check accuracy and consistency across its own datasets and datasets managed by other systems. NIMS platform 110 can maintain rankings for the other systems to indicate the quality of data managed by the systems. NIMS platform 110 can store the additional data entries in the data storage device. NIMS platform 110 can populate the dynamic form field with the additional data entries using the mapping. Stakeholders can view the additional data provided by other stakeholders. NIMS platform 110 can generate and transmit an update alert including a report of the additional data entries for the new issue. This enables other stakeholders to access additional (and up to date) data about the new issue or deal.

The NIMS platform 110 connects to interface application 220 and data sources 230 using network 140. Data sources 230 can provide input data for storage in data storage 210. Network 140 (or multiple networks) is capable of carrying data and can involve wired connections, wireless connections, or a combination thereof. Network 140 may involve different network communication technologies, standards and protocols, for example. The interface application 220 can be installed on user device to display an interface of visual elements that can represent issue related data, for example. The NIMS platform 110 can generate visual elements for a dashboard of an interface application 220 that has different views. Example views include a deal view, mapping view, backfill view, data audit view, report view, and analytics view. Different views for the interface application 220 are shown in FIGS. 7 to 21.

The NIMS platform 110 can include an I/O Unit 102, a processor 104, communication interface 106, and data storage 210. The processor 104 can execute instructions in memory 108 to implement aspects of processes described herein. The processor 104 can execute instructions in memory 108 to configure deal utility 112, mapping utility 114, audit utility 116, report generator 118, interface controller 200, data model 202, process model 204, and other functions described herein. The NIMS platform 110 may be software (e.g., code segments compiled into machine code), hardware, embedded firmware, or a combination of software and hardware, according to various embodiments.

The NIMS platform 110 has a data storage device 210 for storing data models 202, process models 204, and machine executable instructions. The NIMS platform 110 has a processor 104 configured by the machine executable instructions to receive input data for processing by a data mapping tool 114 using the data models 202 to generate data entries. The NIMS platform 110 stores the data entries in the data storage device 210. The interface controller 200 can generate a dynamic form for deal entry at an interface application 220. The dynamic form has form fields automatically populated by a set of data entries of the generated data entries. The audit utility 116 can validate the data entries and additional data received at the interface application 220 for accuracy and compliance. The NIMS platform 110 can generate an alert with an actionable item using a report generator 118 based on the validated data entries. The alert can be a new deal alert, for example.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g. graph database), and persistent storage 114.

The communication interface 106 can enable the NIMS platform 110 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The NIMS platform 110 can be operable to register and authenticate users (using a login, unique identifier, and password for example) prior to providing access to applications, a local network, network resources, other networks and network security devices. The NIMS platform 110 can connect to different machines or entities. The NIMS platform 110 also logs system access and activity, manages approval processes, and communicates to user devices (e.g. at interface application 130).

The data storage 110 may be configured to store information associated with or created by the NIMS platform 110. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

Figure 3:
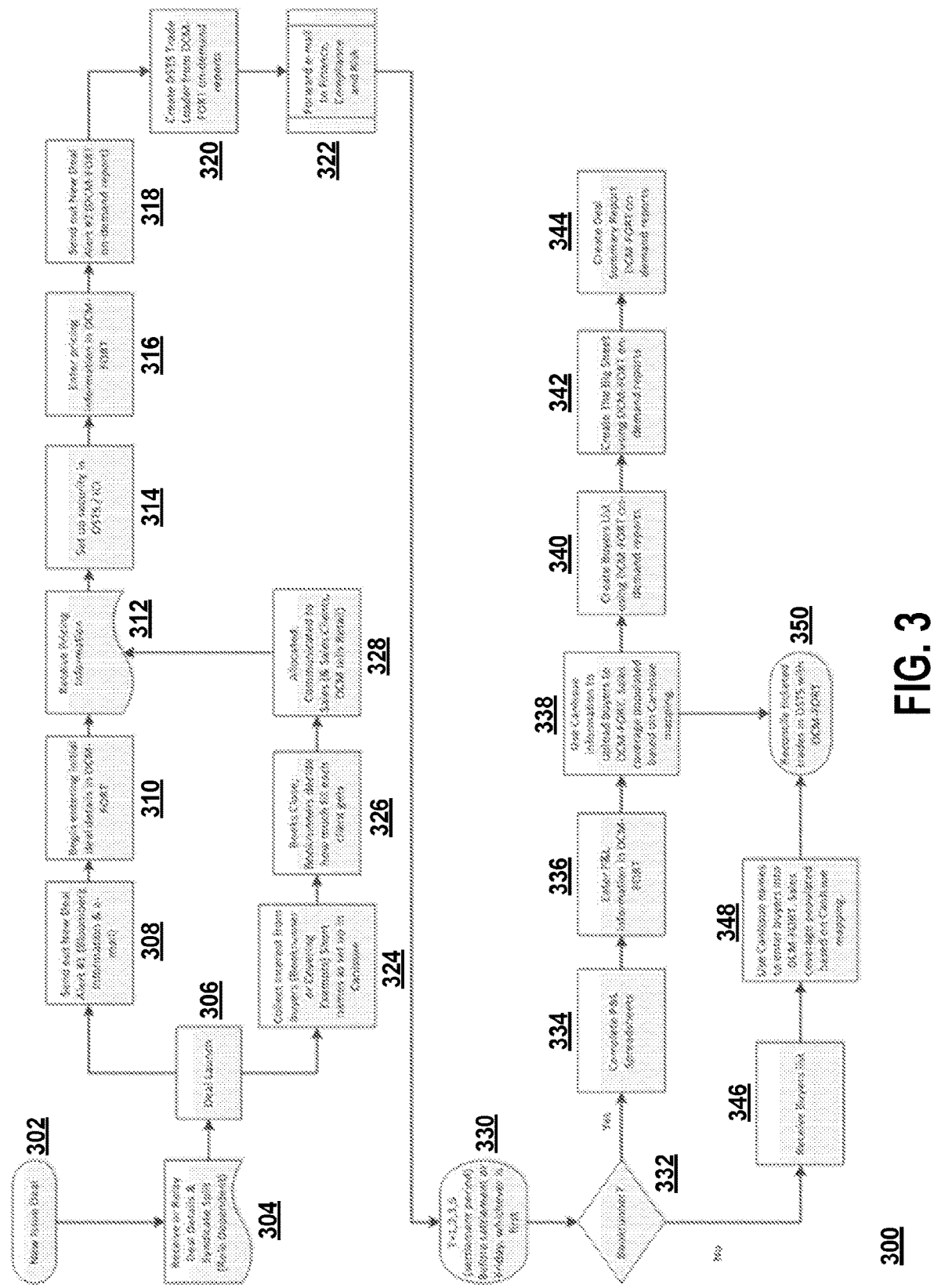
FIG. 3 is a flowchart diagram of a process for corporate deals according to some embodiments.

FIG. 3 is a flowchart diagram of a process 300 for corporate deals according to some embodiments. The process 300 can relate to a capital markets use case. This is an example and the process 300 can be used for different applications and lines of business.

At 302, the deal utility 112 receives a new issue deal command to create a new deal entry. The deal entry is made up of multiple data entries having associated attributes. The data entries can be of different types to represent different types of data.

At 304, the deal utility 112 receives or relays deal data and syndicate split. The deal data can be received from databases 112, database server 140 or data sources 230, for example. The deal utility 112 has a syndication component that can involve origination advice. The syndicate banker obtains market information and investor views either by speaking to investors directly or through liaising with the investment bank's fixed income sales force. They use this information, along with the originator, to formulate the recommendation to the investor. The syndication component can generate visual elements for the origination advice data.

The deal utility 112 has a syndication component that can involve transaction execution. During the execution phase of a transaction, the syndicate bankers work with the investment banker, and the other syndicate desks arrive on pricing, target investors and the strategy required to raise the amount of money that the issuer would like. The bookrunner has overall control of the book build process, liaising with the fixed income sales force to ensure that investors submit orders into the book. As the order book builds, the syndicate desk provides on-going advice on how and when to change the price guidance, when to close the books and at what level to set the final price. Once the order book is closed, the syndicate desk advises on the final issue size and, for an oversubscribed transaction, how many bonds to allocate to each investor. The syndication component can generate visual elements for the transaction execution data.

The deal utility 112 has a syndication component that can involve transaction administration. The syndicate desk is responsible for writing trade tickets with each of the investors allocated bonds, as well as coordinating and aggregating all the 'market hedges' that investors wish to execute at the pricing time. The syndication component can generate visual elements for the transaction administration data.

At 306, the deal utility 112 launches a deal. This can initiate parallel process operations. At 308, the deal utility 112 can generate and transmits new deal alerts (e.g. to interface application 220 or other devices). At 310, the deal utility 112 can populate a deal dashboard or deal entry with initial deal data. At 312, the deal utility 112 receives pricing data from databases 112, database server 140 or data sources 230, for example. At 314, the deal utility 112 sets up security parameters. At 316, the deal utility 112 enters the received pricing data as price data entries of the deal entry. At 318, the deal utility 112 can generate and transmit updated deal alerts (e.g. to interface application 220 or other devices). Alerts are created based on the stage of the deal process. Alerts are transmitted to internal stakeholders and external syndicate partners. At 320, the deal utility 112 can create a trade loader from on-demand reports generated by report generator 118. At 322, the deal utility 112 can transmit an audit and compliance report generated by audit utility 116.

As noted, the deal utility 112 can initiate parallel process operations when a deal is launched at 306. At 324, the deal utility 112 collects interest data from buyers (e.g. bookrunner or covering exempts) and generates data entries with attributes with short names for the collected data. At 326, the deal utility 112 close books and a bookrunner workflow 123 can indicate how much fill each client gets. At 328, the deal utility 112 can allocate commission data and generate commission notifications for transmission to interface application 220 or other devices. The collective interest data is used to position with new issuers and to optimize buyers and allocations.

At 330, the deal utility 112 can track a settlement period (T+1, 2, 3, 4, 5). At 332, the deal utility 112 can determine if there is a bookrunner. If so, at 334, the deal utility 112 can complete profit and loss data and at 336 populates the deal entry with the profit and loss data. At 338, the deal utility 112 can upload buyer data to the deal entry along with sales coverage using data mappings. At 340, the deal utility 112 can create a buyers list using on demand reports generated by report generator 118. At 342, the deal utility 112 can create the big sheet using on demand reports generated by report generator 118. At 344, the deal utility 112 can create a deal summary report using on demand reports generated by report generator 118. If there is no bookrunner, at 346, the deal utility 112 can receive a buyers list and at 348 can upload buyer data to the deal entry along using data mappings. At 350, the deal utility 112 can reconcile ticketed trades using the deal entry.

Figure 4:
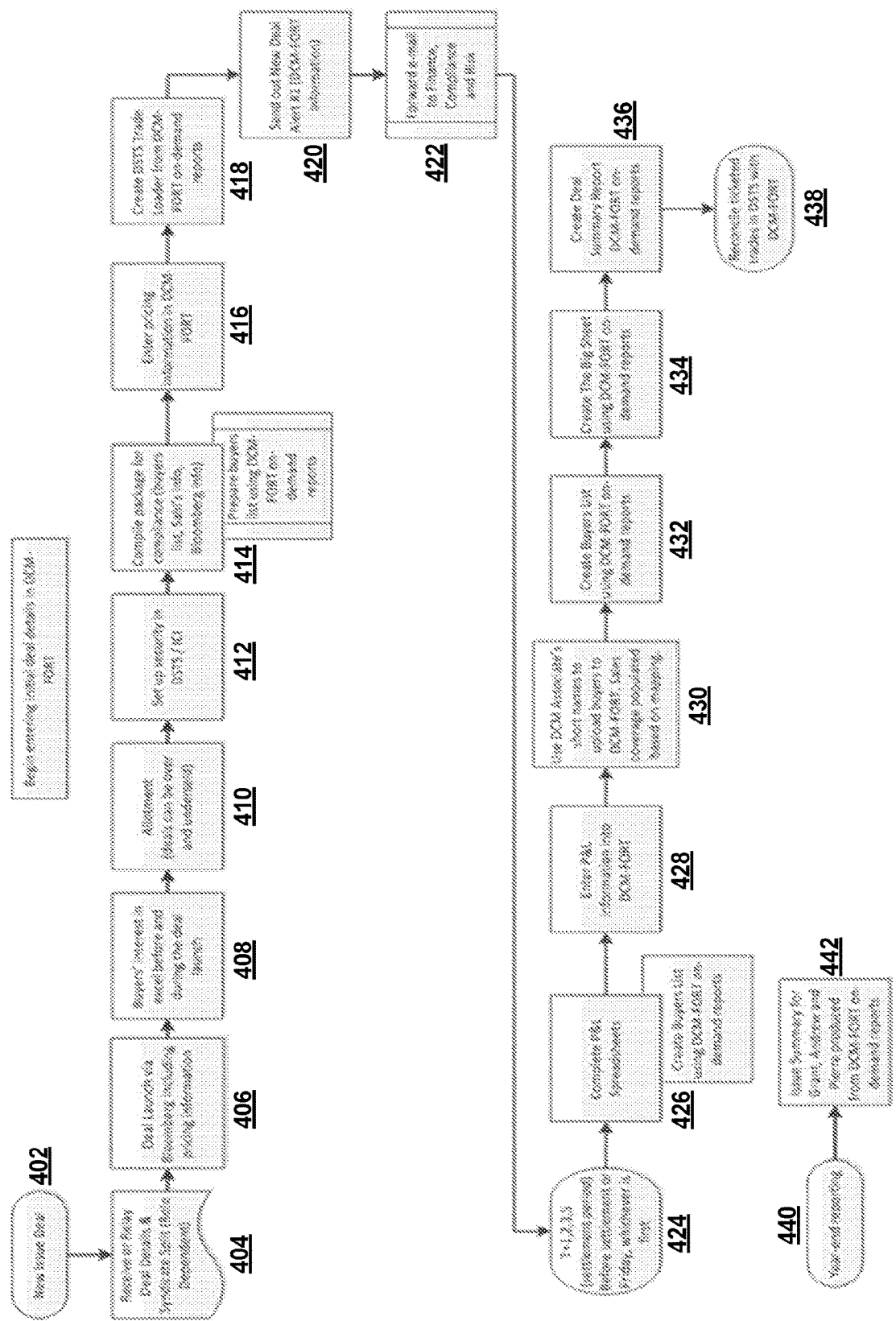
FIG. 4 is a flowchart diagram of a process for government deals according to some embodiments.

FIG. 4 is a flowchart diagram of a process 400 for government deals according to some embodiments. The process 400 can relate to a capital markets use case. This is an example and the process 400 can be used for different applications and lines of business.

At 402, the deal utility 112 receives a new issue deal command to create a new deal entry. The deal entry is made up of multiple data entries having associated attributes. The data entries can be of different types to represent different types of data.

At 404, the deal utility 112 receives or relays deal data and syndicate split. The deal data can be received from databases 112, database server 140 or data sources 230, for example. In this example, the syndicate desk knows the identity of the buyers they sold to and does not know the other participants as they do in other types of new issues. A minor difference is the compliance aspects of allocations as there are a small number of large buyers in the market.

At 406, the deal utility 112 launches a deal. At 408, the deal utility 112 can determine a list of interested buyers to populate a deal dashboard or deal entry. The list of interested buyers is determined based on interest as compared to fills. It is a reverse inquiry where the client identifies their interest and secondary trading patterns. At 410, the deal utility 112 implements allotment (as deals can be oversold and undersold). At 412, the deal utility 112 sets up security parameters. At 414, the deal utility 112 can compile an audit and compliance report generated by audit utility 116 (e.g. buyers list, financial data) and on-demand reports generated by report generator 118. At 416, the deal utility 112 enters the received pricing data as price data entries of the deal entry. At 418, the deal utility 112 can create a trade loader from on-demand reports generated by report generator 118. At 420, the deal utility 112 generates new deal alerts. At 42, the deal utility 112 transmits the new deal alerts (e.g. to interface application 220 or other devices). The new deal alerts indicate deal details and summary data. The new deal alerts are generated using data stored and managed by the platform 110 the platform 110 provides a central access point to updated data regarding the deal that is used to generate the alerts.

At 424, the deal utility 112 can track a settlement period (T+1, 2, 3, 4, 5). At 426, the deal utility 112 can complete profit and loss data and at 428 populates the deal entry with the profit and loss data. At 430, the deal utility 112 can upload buyer data to the deal entry along with sales coverage using data mappings. At 432, the deal utility 112 can create a buyers list using on demand reports generated by report generator 118. At 434, the deal utility 112 can create the big sheet using on demand reports generated by report generator 118. At 436, the deal utility 112 can create a deal summary report using on demand reports generated by report generator 118. At 438, the deal utility 112 can reconcile ticketed trades using the deal entry. At 440, the deal utility 112 can generate a year-end report of deal entry data using report generator 118. At 442, the deal utility 112 can issue summary for grant using the on demand reports generated by report generator 118.

The following table provides an overview of terms referred to in the processes 300, 400.

| Task Name | Description |
|---|---|
| Send an initial New Deal Alert | Copy information from data source and send via Content Manager |
| Enter deal details into database | Enter requisite deal details into interface or deal entry (including pricing information) Elements or entries calculated and populated automatically. |
| Send another updated New Deal Alert | Create a plain-text report and on-demand reports and populate data into Content Manager and deal entry. |
| Set up security | Send security information |
| Allocate fills for each buyer | Enter final allocations in deal entry |
| Record buyer information | Download buyers list including fill. Upload to deal entry. Where more than 1 salesperson covers legal entity, specify the salesperson from an auto-populated drop-down menu. Syndicate Participation: select name from drop-down and enter fill for each buyer on marketing entity basis. mapping table from name to split and/or UEN/legal name In both instances, the marketing names can map to a UEN/Legal name, split (where applicable) and pull in sales coverage. |
| Enter tickets | Produce ticket loader from on-demand reports |
| Record syndicate split information | Record syndicate information in deal entry including: Dealer name, rank, role, share (%) and Step-up (%) |
| Disseminate syndicate split information | Pre-populate information using on-demand reports to load into deal entry |
| Enter salesperson details | Salesperson names pre-populated when the buyers list is uploaded based on the mapping table. In cases where multiple salespeople cover a single legal entity, a drop-down of possible salespeople will appear as an intermediate step before submission. No requirement for Sales Associate to apply sales % split as legal entities can populate more than one line. mapping table from name to split and/or UEN |
| Record legal entity in buyer details | uploads name and the mapping table automates a consistent match to legal entity and sales coverage mapping table from name to split and/or UEN |
| Map existing name to legal entity and/or split | Mapping table to map new names as they enter the system Perform validation Create IDs for clients without UENs. Monthly search for client names with IDs Set up process in Front Office to perform monthly check |
| Reconcile clients and salespeople | Create delta reports between ticket data and buyers in deal entry to ensure correct mappings. |

In order to ensure that all applicable data fields are in NIMS 110, underlying calculations are correct and functionality is complete, numerous test scripts can be provided to end users. Test scripts can encompass data entry, data upload functionality and reporting. Test scripts will cover the various deal types (corporate, provincial, ABS, MBS, etc.) with different issue features, including but not limited to standard deals, carve outs, issues that are oversold, step-ups, etc. Test scripts can also be established for delta reporting. The test scripts simulate processing the various types of new bond issues and associated reporting and analytics.

The following table provides example data fields for a deal entry, data models and process models that can be used by NIMS 110.

| Data Field ID # | Field Name | Field Type | Example |
|---|---|---|---|
| A-1 | Business Date | | |
| A-2 | DCM-FORT ID | Auto-Number | |
| A-3 | Access ID | | |
| A-4 | CUSIP ID | Free Text | 11070TAJ7 |
| A-5 | ISIN ID | Free Text | CA11070TAJ75 |
| A-6 | ADP Code | | |
| A-7 | Salesforce ID | | |
| A-8 | Re-opened issue flag | Y/N | Yes, No |
| A-9 | Issuer | Drop-down list (Issuer & Dealer Table; IF F-3 = T, display F-2 in dropdown) | Province of |
| A-10 | Issue Method | Drop-down list (With ability to fill in?) | Government Provincial/Rated Private |
| A-11 | Product | Drop-down list (With ability to fill in?) | Government Bonds |
| A-12 | Maturity date | Date (MM/DD/YYYY) | 9/4/200x |
| A-13 | Currency | Drop-down list | CAD |
| A-14 | Interest Rate | Free Text (#) | 2.30% |
| A-15 | Trade Price | Free Text (#) | 100.00 |
| A-72 | Re-offer Price | Free Text (#) | 100.41 |
| A-16 | Average Life | | |
| A-17 | Structured Note Description | | |
| A-18 | Issue Description | Building List | |
| A-19 | Issue Remark | Free Text (alpha-numeric) | |
| A-20 | Pricing Date | Date (MM/DD/YYYY) | 9/4/200x |
| A-21 | Closing Date | Date (MM/DD/YYYY) | 9/4/200x |
| A-22 | Interest Payment Dates | Free Text (alpha-numeric) | January 23, July 23 |
| A-23 | Frequency | Radio Buttons | Frequent or First Time |
| A-24 | Issue Oversubscribed flag | Y/N | Yes, No // Alternately, if SUM of Investors (C-3) |

-continued

| Data Field ID # | Field Name | Field Type | Example |
|---|---|---|---|
| | | | ex. Other DCM Investors > Amount (A-25)*Share % (B-4), the issue is oversold |
| A-81 | Oversubscribed Selling Price | $ | If Issue is oversubscribed, the desk must buy additional bonds elsewhere at an indeterminate price |
| | If an Issue is Oversubscribed, a secondary P&L will be calculated at the 'ideal' amount of sales, demonstrating the maximum amount of profit available if not oversold. | | |
| A-76 | Factor | Free Text (#) | Factor (A-76) and Original Issue Size (A-77) for MBS Securities new issues. If factor is applied, Factor*Original Issue Size = A-25 |
| A-77 | Original Issue Size | Free Text (#) in MM (millions) | |
| A-25 | Amount | Free Text (#) in MM (millions) | 500 |
| A-26 | Credit Spread | Free Text (#) | 80 bps |
| A-27 | Benchmark #1 | Drop-down list (Benchmark securities table: D-1) | 1.5% 01-Jun-26 |
| A-28 | Benchmark #2 | Drop-down list (Benchmark securities table: D-1) | |
| A-29 | Curve Adjustment | Numeric | |
| A-30 | Delay Adjustment | Numeric | |
| A-31 | Yield | Free Text (#) in % | 2.15% |
| A-33 | Call Spread | Free Text (#) | bps |
| A-34 | Transaction Type | Drop-down list | Bought Deal |
| A-75 | Fee Split flag | Y/N | |
| A-52 | Step-Up Percent | Free Text (#) in % | |
| A-56 | Fee Note | | |
| A-50 | Underwriting Fee (Commission Institutional Percentage) | Free Text (#) in % | |
| A-51 | Selling Concession (Commission Retail Percent) | Free Text (#) in % | |
| A-62 | Banking Cost | % (eg. 2%) | |
| A-65 | Management Fee | | |
| A-80 | Firm (%) | | |
| A-66 | Carveout flag | Y/N | |
| A-67 | Carveout Amount | | If Carveout = Y, User must specify the amount of the issue that has been carved out |
| A-68 | IDA Fees | $ | If carveout, replicate field (ie. 2 IDA different Fees required) |
| A-69 | Other Estimated Expenses | $ | If carveout, replicate field (ie. 2 different Estimated Expenses required) |
| A-70 | Syndicate Hedging (Sales) | Amount/Price -- Ability to add rows | |
| A-71 | Syndicate Hedging (Purchases) | Amount/Price -- Ability to add rows | |
| A-78 | Banking Costs on New Issue | $ Interest/Carry - Ability to add rows | |
| A-79 | Collateral Costs on New Issue | $ Interest/Carry - Ability to add rows | |
| A-81 | Banking Costs on Hedge | $ Interest/Carry - Ability to add rows | |
| A-82 | Collateral Costs on Hedge | $ Interest/Carry - Ability to add rows | |
| A-57 | DBRS | Building List | |
| A-58 | Moodys | Building List | |
| A-59 | S&P | Building List | |
| A-60 | SIC | | |
| A-83 | Inventory | | |

| Data Field ID # | Field Name | Field Type | Example |
| --- | --- | --- | --- |
| A-73 | Drawdown Price/S/G Drawdown | Calculated based off of other fields | |
| A-74 | Banking Cost/Cost to B/G | Calculated based off of other fields | |
| A-32 | Cost Price/Price from Company | Calculated based off of other fields | |
| A-37 | Issue Expenses | Calculated based off of other fields | |
| A-38 | Retail Fees | Calculated based off of other fields | |
| A-35 | Gross Fees | Calculated based off of other fields | |
| A-36 | Inventory Losses (Gains) | Calculated based off of other fields | |
| A-39 | Net Fees | Calculated based off of other fields | |
| A-40 | I&CB Gross Fees | Calculated based off of other fields | |
| A-41 | I&CB Net Fees | Calculated based off of other fields | |
| A-42 | Fixed Income Gross Fees | Calculated based off of other fields | |
| A-43 | Fixed Income Net Fees | Calculated based off of other fields | |
| A-53 | % Sold - Institutional | Calculated based off of other fields | |
| A-54 | % Sold - Retail | Calculated based off of other fields | |
| A-55 | Retail Drawdown | Calculated based off of other fields | |
| A-64 | Commission | Calculated based off of other fields | |
| A-44 | US Gross Fees | | |
| A-45 | US Net Fees | | |
| A-46 | UK Gross Fees | | |
| A-47 | UK Net Fees | | |

The following table provides example data fields for syndicate workflow 120 that can be used by NIMS 110 that can relate to NEW_ISSUE_SYNDICATE_ENTRY

| Data Field ID # | Field Name | Field Type | Example |
| --- | --- | --- | --- |
| B-1 | Dealer | List of names—drop down or picklist? (Issuer & Dealer Table; IF F-4 = T, display F-2 in list) | Bank Inc. |
| B-2 | Rank | | 1 |
| B-3 | Role | | Bookrunner |
| B-4 | Share (%) | | 50% |
| B-5 | Step-Up (%) | | 80% |
| B-6 | Participation Rate (Management Fee) (%) | | 12.5% |
| B-7 | Selling Group flag | Y/N | |
| B-8 | Modified Date | Date | |

Must be able to add multiple entries in this section. For example there may be 5-10 dealers in the Syndicate and 2-5 dealers in the Special Selling Group. These two groups must be distinct for reporting purposes.

The following table provides example data fields for buyer data that can be used by NIMS 110 that can relate to NEW_ISSUE_BUYERS_ENTRY.

| Data Field ID # | Field Name | Field Type | Example |
| --- | --- | --- | --- |
| C-1 | Investor | UPLOAD | Name Inc. |
| C-2 | Investor—Formatted Name | Dynamic (IF E-1 = C-1 display E-2) | |
| C-3 | Amount | UPLOAD | 5000000 |
| C-4 | Region | Dynamic (IF E-1 C-1 display E-3) | Ontario |
| C-5 | Salesperson Code | Dynamic (IF E-1 C-1 display E-4) | 5DD |
| C-6 | Interest | | |
| C-7 | Split | Dynamic (IF E-1 C-1 display E-5) | client.split |
| C-8 | Industry | Dynamic (IF E-1 C-1 display E-6) | Pension Fund |
| C-9 | Salesperson Name | Dynamic (IF E-1 C-1 display E-7) | First Name, Last Name (If more than one salesperson covers legal entity, technology solution required to present the various salesperson options) |
| C-10 | UEN | Dynamic (IF E-1 C-1 display E-8) | 240696 |
| C-11 | Legal Name | Dynamic (IF E-1 C-1 display E-9) | Name Inc. |
| C-12 | Modified Date | Date | |

Must be able to add multiple entries in this section

The following table provides example data fields for securities data that can be used by NIMS 110. The security parameters can be updated using vendor data and with in-house system.

| Data Field ID # | Field Name | Field Type | Example |
|---|---|---|---|
| D-1 | Benchmark Security | | CAN 3.25 JUN21 |
| D-2 | Benchmark Price | | $112.73 |
| D-3 | Benchmark Yield | | 0.599% |

The following table provides example data fields for buyers data that can be used by NIMS 110.

| Data Field # ID | Field Name | Field Type |
|---|---|---|
| E-1 | Investor Short Name | KEY |
| E-2 | Investor—Formatted Name (Name) | |
| E-3 | Buyer Region | |
| E-4 | Salesperson Code | E-5 DSTS_SHORT = E-4 SALES_TRANSACTOR_ID NORMALIZED |
| E-5 | Split (Account Code) | |
| E-6 | Industry Code | |
| E-7 | Salesperson Name | E-4 SALES_TRANSACTOR_ID = E-7 (DSTS Field TBD) NORMALIZED |
| E-8 | UEN | |
| E-9 | Legal Name | E-8 in APMS = E-9 NORMALIZED |
| E-10 | Distribution Attestation Flag | Y/N |
| E-11 | Modified Date | Date |

The following table provides example data fields for issuers and dealers data that can be used by NIMS 110.

| Data Field ID # | Field Name | Field Type |
|---|---|---|
| F-1 | UEN | |
| F-2 | Legal name | Dynamic—Tied to APMS NORMALIZED |
| F-3 | Issuer Flag | Y/N |
| F-4 | Dealer Flag | Y/N |
| F-5 | Dealer Class | Drop-down |
| F-7 | Industry Code | Selection |
| F-8 | Modified Date | Date |

Report generator 118 can produce standard reports based on shared data elements. Included below are the data elements for sample deliverables (New Deal Alert, Trade Loader and Corporate Buyer List). Other more complex deliverables such as P&L Reports can also be mapped.

The following table provides example data fields for a New Deal Alert that can be used by NIMS 110 as an on demand report that can be generated by report generator 118.

| Column Header | Data or Field ID # |
|---|---|
| ISSUE INFORMATION | |
| Issuer | A-9 |
| Cusip ID | A-4 |
| Bond Type | A-18 |
| Amount | A-25 |
| Coupon | A-14 |
| Maturity | A-12 |
| Pricing | A-20 |
| Closing | A-21 |
| Method | A-10 |
| Product | A-11 |

-continued

| Column Header | | Data or Field ID # |
|---|---|---|
| PRICING | | |
| Spread | | A-26 |
| Benchmark | | A-27 |
| Curve | | A-29 |
| Yield | | A-31 |
| Issue Price | | A-15 |
| Cost Price | | A-32 |
| Call Spread | | A-33 |
| Deal Type | | A-34 |
| FEES | | |
| Institutional Fee | | A-50 |
| Retail Fee | | A-51 |
| Step-up | | A-52 |
| Institutional Split | | A-53 |
| Retail Split | | A-54 |
| Retail Drawdown | | A-55 |
| Fee Note | | A-56 |
| RATINGS | | |
| DBRS | | A-57 |
| Moodys | | A-58 |
| S&P | | A-59 |
| GENERAL | | |
| Remark | | A-19 |
| DEALER/SHARE/ROLE | | |
| Syndicate Dealers, Shares & Role | Table/Multiple Rows | B-1, B-4, B-3 |
| Key Contacts | | |
| DCM Syndication | | |
| Retail Inquiries | | |
| Retail Desk | | |

The following table provides example data fields for a Trade Loader that can be used by NIMS 110 as an on demand report that can be generated by report generator 118.

| Column Header | | Data or Field ID # |
|---|---|---|
| Trade B/S | Sell | n/a |
| Par | | C-3 |
| Security Cusip | | A-4 |
| Price | | A-15 |
| Customer Short Name | | C-1 or C-2 |
| Portfolio | | |
| Trade Date | | A-20 |
| Settlement Date | | A-21 |
| Comments | W4 | n/a |
| SalesID | | C-5 |
| Hedge | | |

The following table provides example data fields for a Corporate Buyer List that can be used by NIMS 110 as an on demand report that can be generated by report generator 118.

| Column Header | Data or Field ID # |
|---|---|
| Private & Confidential | |
| CM Logo | |
| Issuer | A-9 |
| Description | A-18 |
| Remark | A-19 |

-continued

| Column Header | Data or Field ID # | |
|---|---|---|
| INVESTOR LIST | | |
| Investor | Fill (000,000's) | Region |
| C-2 | C-3 | C-4 |
| Total Buyers | | Sum of C-2 |
| Deal Size | | A-25 |
| TRANSACTION DETAILS | | |
| Issue Size | A-25 | |
| Coupon | A-14 | |
| Expected Final Payment Date | A-12 | |
| Price | A-15 | |
| Yield | A-31 | |
| Spread vs Curve | A-26 vs. (A-27 & A-28) | |
| Spread vs BM | A-26 (A-29 + A-30) | |
| BM Price/Yield | A-27: D-2/D-3 | |
| Settlement Date | A-21 | |
| Pricing Date | A-20 | |
| Interest Payment Dates | A-22 | |

-continued

| Column Header | Data or Field ID # | |
|---|---|---|
| Ratings | DBRS: A-57/Moody's: A-58/S&P: A-59 | |
| CUSIP/ISIN | A-4/A-5 | |
| SYNDICATE | | |
| Dealer | Role | Economics |
| B-1 | B-3 | B-4 |

The report generator 118 can produce ad-hoc reports. For example, the top 10-20 data elements can be determined with user base to be incorporated into a search download on demand report. The report generator 118 can compare ticketed transactions with output from the data capture interface in order to flag and correct inconsistencies almost immediately. The interface application can filter the data.

The following table provides example calculated data fields for profit and loss that can be used by NIMS 110.

| Field | Field Name | Plain Language Logic | Field IDs |
|---|---|---|---|
| A-73 | Drawdown Price/S/G Drawdown | Trade Price less Selling Concession | A-15-A-51 |
| A-74 | Banking Cost/Cost to BIG | Drawdown Price less Banking Cost % | A-73-A-62 |
| A-32 | Cost Price/Price from Company | Cost to B/G less Management Fee (If Management Fee is 0, Cost Price will equal Banking Cost) | A-74-A-65 |
| A-35 | Gross Fees | Provy: Taken from P&L #2: Management Fees plus Profit from Above Price Sales by Desk plus Commissions Corporate: Management Fee + Step-Up + Banking Group Profit + P/L from Syndicate Hedge + Syndicate Banking & Collateral Cost + P/L from Hedge + Other Estimated Expenses* Participation Rate (A-69) | |
| A-36 | Inventory Losses (Gains) | Provy: 1. From P&L #2: Loss from Sales to Retail plus Profit from Above Price Sales by Desk 2. From P&L: Profit/Loss from Hedge plus Banking on Hedge plus Loss From Sales to Retail plus Profit from Above Price Sales by Desk plus Banking on New Issue 3. Subtract 2 from 1 to get Profit or Loss Corporate: Profit/Loss from Hedge + Profit from Sales to Retail + Net Banking & Collateral Costs | |
| A-37 | Issue Expenses | Provy: IDA Fees plus Other Estimated Expenses If Carveout Flag = Y, sum secondary fields Corporate: Other Estimated Expenses * Participation Rate (BMO's portion) or Other Estimated Expenses | (A-68*B-4) + (A-69*B-4) If A-66 = Y, ((A-68*B-4) + (A-69*B-4)) + ((A-68Carveout*B-4) + (A-69Carveout*B-4)) |
| A-38 | Retail Fees | (Retail Fill*Cost to Public) + (Retail Fill*Drawdown Price*-1)*Share % | ((Where C-1 = Retail, display C-3)*A-15) + ((Where C-1 = Retail, display C-3)*A-73*-1)*B-4 |

| | | | |
|---|---|---|---|
| A-39 | Net Fees | Where Applicable (across Provy & Corporate P&Ls): Sum Management Fee, Step-Up, Banking Group Profit, P&L From Hedge, Profit/Loss from Sales to Retail, Profit from Above Price sales by Desk and Net Banking and Collateral Costs, Fees (Provy), Expenses (Provy) and Commissions. If Carveout, Net Fees derived from both P&Ls | See elaboration below |
| A-40 | I&CB Gross Fees | If Fee Split = Y, then Gross Fees*.5 | If A-75 = Y, A-35*.5 |
| A-41 | I&CB Net Fees | If Fee Split = Y, then Net Fees*.5 | If A-75 = Y, A-39*.5 |
| A-42 | Fixed Income Gross Fees | If Fee Split = Y, then Gross Fees*.5 | If A-75 = Y, A-35*.5 |
| A-43 | Fixed Income Net Fees | If Fee Split = Y, then Net Fees*.5 | If A-75 = Y, A-39*.5 |
| A-55 | Retail Drawdown | Convert Selling Concession % into $ | A-51% = A-55$ |
| A-53 | % Sold—Institutional | Where Investor* Retail, sum buying amounts. Divide by sum of all Investors (including retail). | Where C-1≠ Retail, sum C-3 and divide it by the sum of ALL in C-3 |
| A-54 | % Sold—Retail | Where Investor = Retail, display retail buying amoung. Divide retail buying amount by the sum of ALL investors (including retail) | Where C-1 = Retail, display C-3 and divide it by the sum of ALL in C-3 |

| Field Name | Plain Language Logic | | Field IDs |
|---|---|---|---|
| Loss from Sales to Retail/Profit from Sales to Retail | (Where Investor = Retail, display Amount)*(Price to Public-S/G Drawdown) | | (Where C-1 = Retail, display C-3)*(A-15-A-73) |
| Profit from Above Price Sales by Desk | Sum of Sales & Purchases by Bond Desk (see 4 rows below) | | |
| | Sales to Retail: (Where Investor = Retail, display Amount)*(Price to Public-S/G Drawdown) | | (Where C-1 = Retail, display C-3)*(A-15-A-73) |
| | Sales to Institutional: (Where Investor = Institutional, display Amount)*(Price to Public-S/G Drawdown) | | (Where C-1≠ Retail, sum C-3 and display)*(A-15-A-73) |
| | Purchases: Allotment* Price to Selling Group | | (B-4*A-25*A-80)*A-73 |
| | Purchases: (Where Investor = Institutional, display Amount)-Allotment* Oversubscribed Price | | Where C-1≠ Retail, sum C-3 and display-(B-4*A-25*A-80)*A-81 |
| Allotment | Share %* Issue Size* Firm % | | B-4*A-25*A-80 |
| P/L from Hedge/ Syndicate Hedging/ Profit from Hedge | Syndicate Hedging(Sales) Amount*Price + Syndicate Hedging(Purchase) Amount*Price | | Sum A-70 + A-71 |
| Banking on Hedge/ Net Banking & Collateral Costs | Banking Costs on Hedge (Interest & Carry) + Collateral Costs on Hedge (Interest & Carry) | | Sum A-81 + A-82 |
| Banking on New Issue | Banking Costs on New Issue (Interest & Carry) + Collateral Costs on New Issue (Interest & Carry) | | Sum A-78 + A-79 |
| Management Fee | Corporate: Net Management Group Profit* U/W % Provy: Amount*Participation Rate*Management Fee | | ((A-25*A-74) − (A-25*A-32*-1) + (A-52*(A-25*A-74) − (A-25*A-32*-1)))*B-4 |
| Step-Up | Step-Up*-1* BMOCM Step-up % | | A-52*-1*B-5 |
| Banking Group Profit | Net Banking Group Profit*U/W % | | |
| Net Management Group Profit | 1. Gross Amount: (Amount*Cost to B/G)-(Amount*Price from Company*-1) 2. Step-up: Step-Up*Gross Amount* 5*-1 3. Sum Gross Amount + Step Up | | (A-25*A-74) − (A-25*A-32*-1) + (A-52*(A-25*A-74) − (A-25*A-32*-1)) |
| Net Banking Group Profit | Sum of Sales & Purchases by Bond Desk − Hedge Loss and Estimated Expenses | | |

Figure 5:
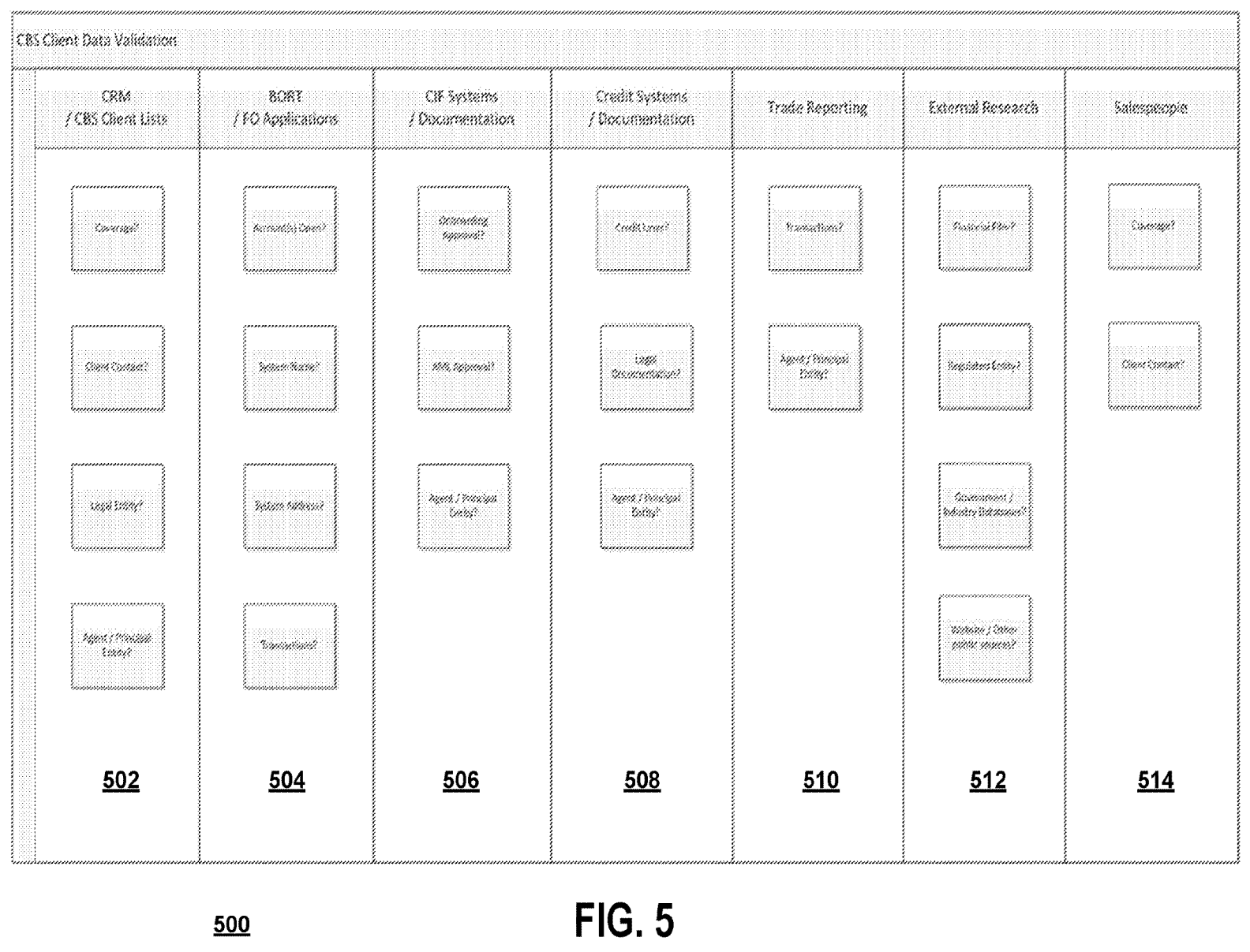

FIG. 5 is a flowchart diagram of a process 500 for client data validation. The process 500 involves client lists 502, applications 504, CIF systems/documents 506, credit systems/documents 508, trade reporting 510, external research 512, sales people 514. The client lists 502 include coverage, client contact, legal entity, and agent/principal data. The applications 504 include accounts open, system name, system address, and transaction data.

The CIF systems/documents 506 can include onboarding approval, AML approval, agent/principal entity data. The credit systems/documents 508 can include credit lines, legal documentation, and agent/principal data. The trade reporting 510 can include transaction and agent/principal entity data. The external research 512 can include financial filter, regulated entity, government/industry, and public source data. The sales people 514 can include coverage and client contact data. The Client Data Validation process can validate and confirm Issuers, Syndicates, Investors—who they are and their activity. This process is embedded in the NIMS platform 100 as code logic for Issuer or Investor mapping adjudications, account mappings, Issuer/Syndicate/Investor information verification, and so on.

Figure 6:
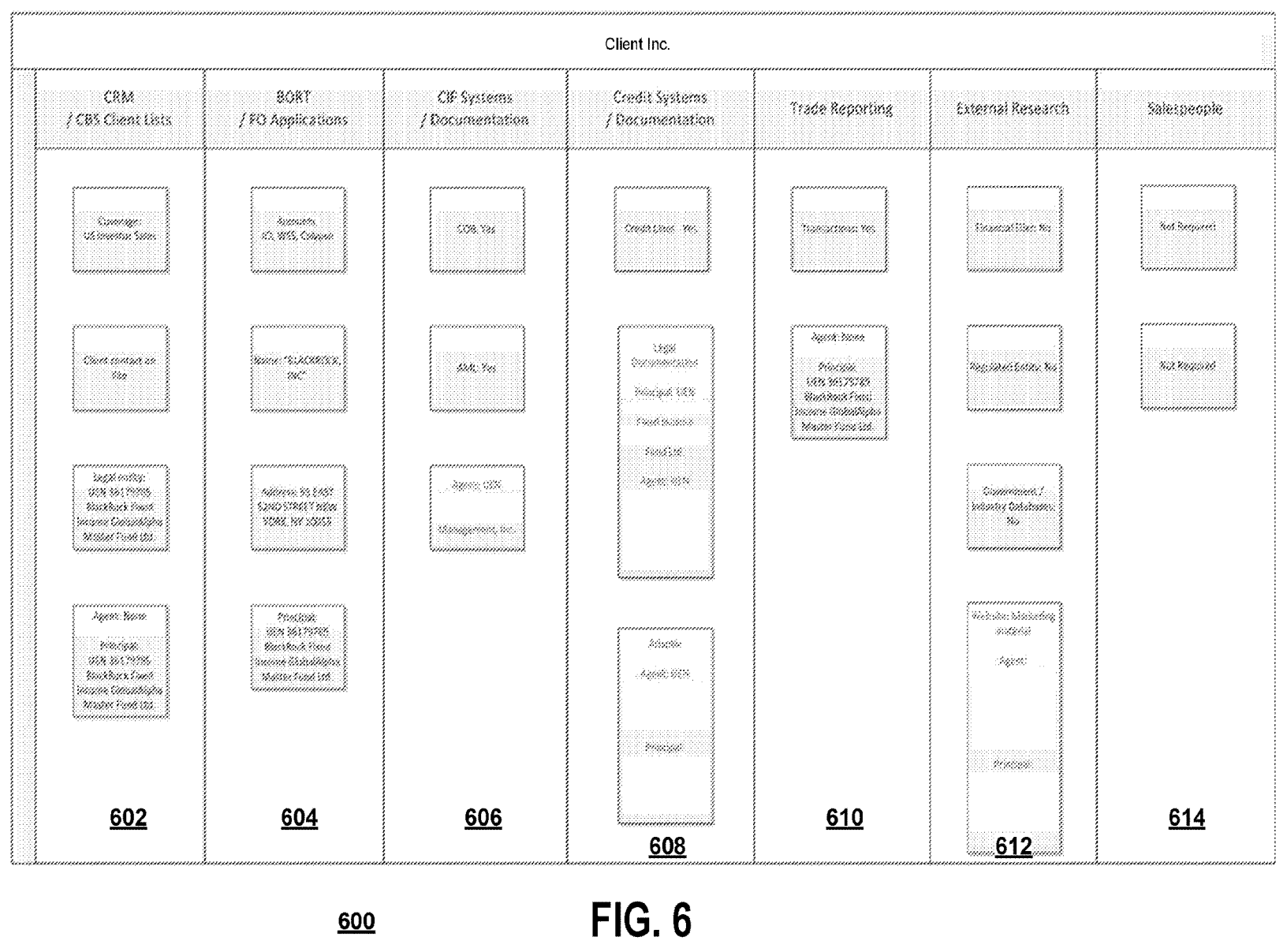

FIG. 6 is a flowchart diagram of another example process 600 for client data validation with example data populated. The process 600 involves client lists 602, applications 604, CIF systems/documents 606, credit systems/documents 608, trade reporting 610, external research 612, sales people 614. The client lists 602 include coverage (US inventor sales), client contact, legal entity, and agent/principal data. The applications 504 include accounts, system name, system address, and principal data. The CIF systems/documents 506 can include COB, AML, agent/principal entity data. The credit systems/documents 508 can include credit lines, legal documentation, and agent/principal data. The trade reporting 510 can include transaction and agent/principal entity data. The external research 512 can include financial filter, regulated entity, government/industry, and public source data.

The following table provides example calculated data fields for buyers that can be used by NIMS 110.

| Data Field ID # | Field Name | Example Association |
|---|---|---|
| C-1 | CanIssue Investor | Investor Name |
| C-2 | CanIssue Investor—Formatted Name | "Investor" |
| C-3 | Amount | $5,000,000 |
| C-4 | Region | Ontario |
| C-5 | Salesperson Code | 5DD |
| C-6 | Interest | $7,000,000 |
| C-7 | DSTS Split | client.split |
| C-8 | Industry | Pension Fund |
| C-9 | Salesperson Name | First Name, Last Name (If more than one salesperson covers legal entity, technology solution required to present the various salesperson options) |
| C-10 | UEN | 240696 |
| C-11 | Legal Name | Board |

The following table provides example calculated data fields for issuers and dealers that can be used by NIMS 110.

| Data Field ID # | Field Name | Field Type Association |
|---|---|---|
| F-1 | UEN | 4191 |
| F-2 | Legal name | Name Inc. |
| F-3 | Issuer Flag | Y |
| F-4 | Dealer Flag | N |
| F-5 | Dealer Class | N |
| F-7 | Industry Code | Transportation |

Figure 7:
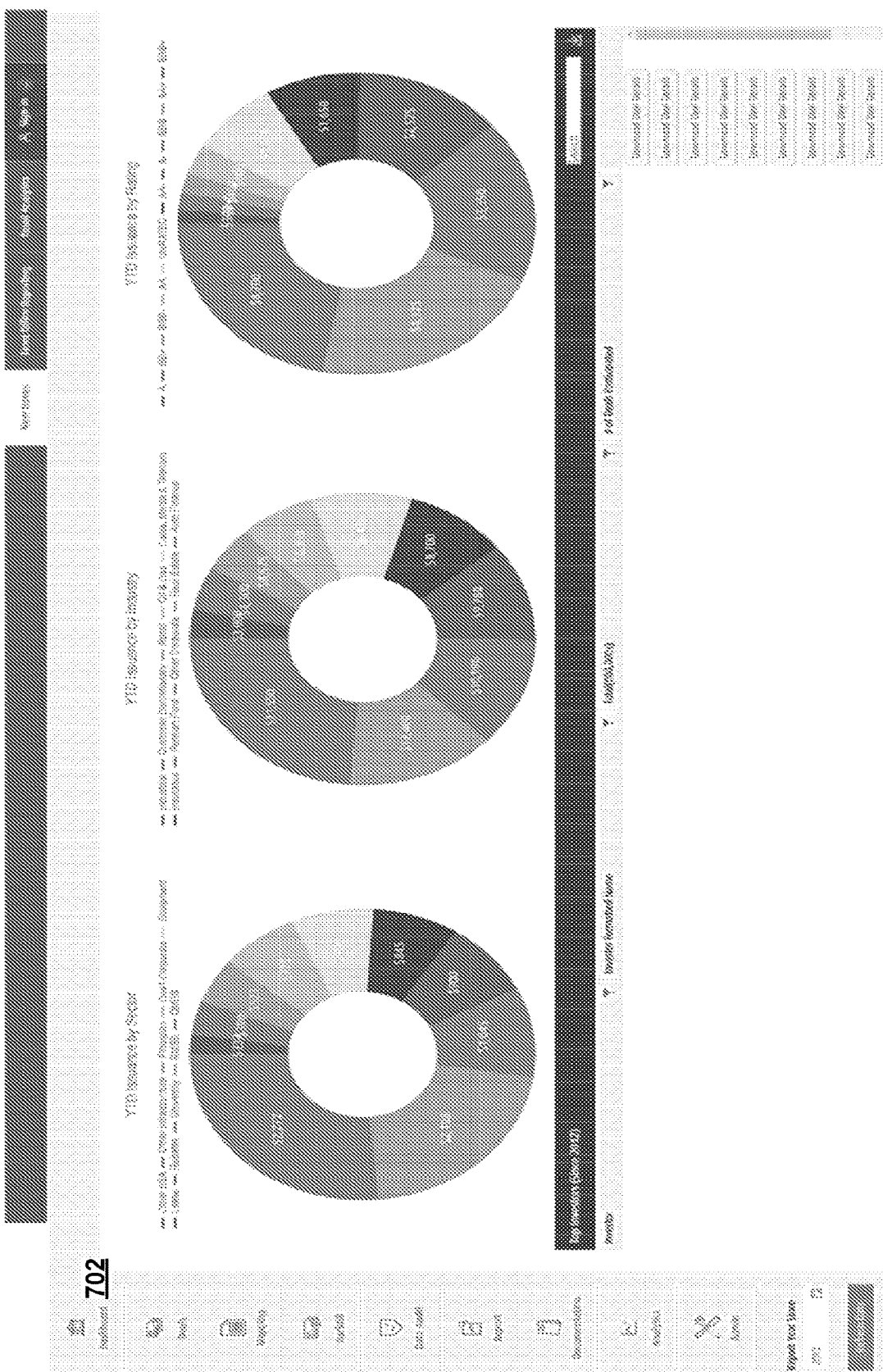
FIG. 7 is a diagram of an interface for a dashboard page.

FIG. 7 is a diagram of an interface for a dashboard page 700 that can be displayed in response to activation of a dashboard button 702. The dashboard page 700 has visual elements for graphs relating to comparative data for issuance by sector, rating and industry, along with a listing of top investors over a time frame.

Figure 8:
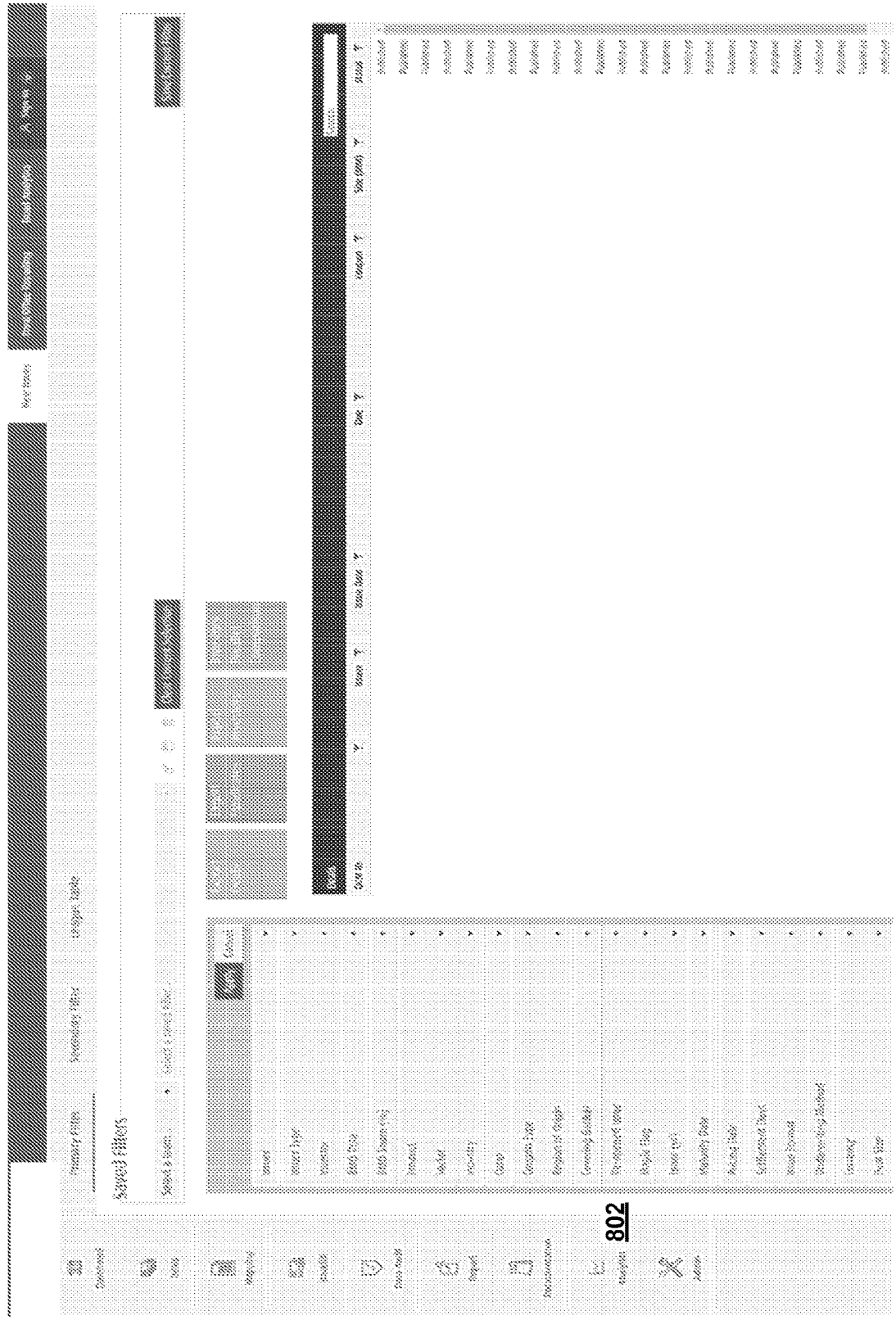
FIG. 8 is a diagram of an interface for an analytics page with filtering ability and report exports (by deals, syndicates, and investors).

FIG. 8 is a diagram of an interface for an analytics page 800 with filtering features and report exports. The filtering can be by different parameters, such as deals, syndicates, and investors. The analytics page 800 can be displayed in response to activation of an analytics button 802. The parameters are shown as selectable visual elements of the page 800 to dynamically configure the reports.

Figure 9:
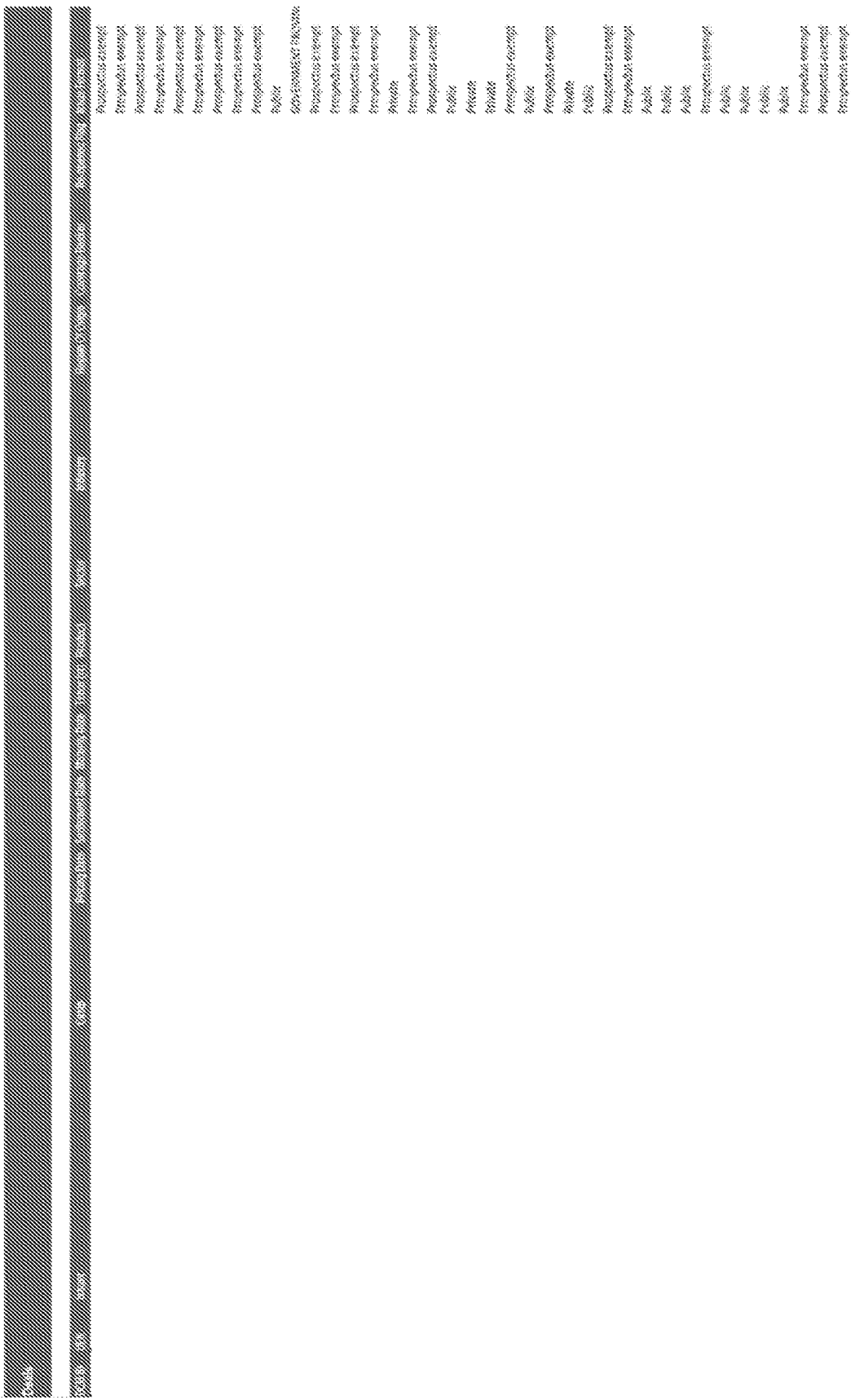
FIG. 9 is a diagram of an interface for deal export report example (exports based on filters selected).

FIG. 9 is a diagram of an interface for deal export report 900 example. The exports are generated based on filters selected (e.g. selected parameters).

Figure 10:
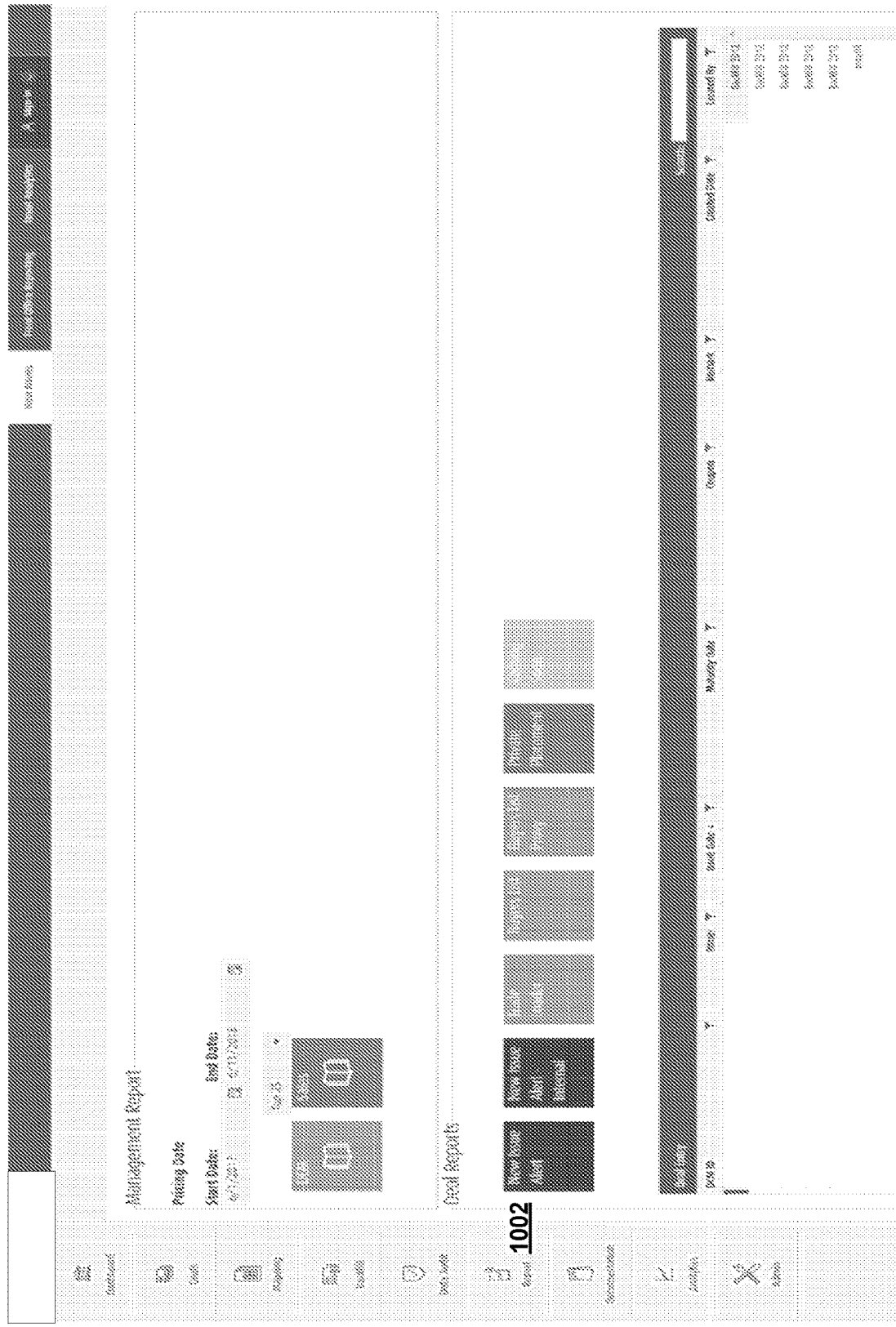
FIG. 10 is a diagram of an interface for a report page.

FIG. 10 is a diagram of an interface for a report page 1000. The report page 1000 can be displayed in response to activation of a report button 1002. The report page 1000 enables configuration of alerts with actionable items, such as new issue alerts, trade loader, buyers lists, private placement, and so on. The report page 1000 has selectable indicia to define a report time period or frame.

Figure 11:
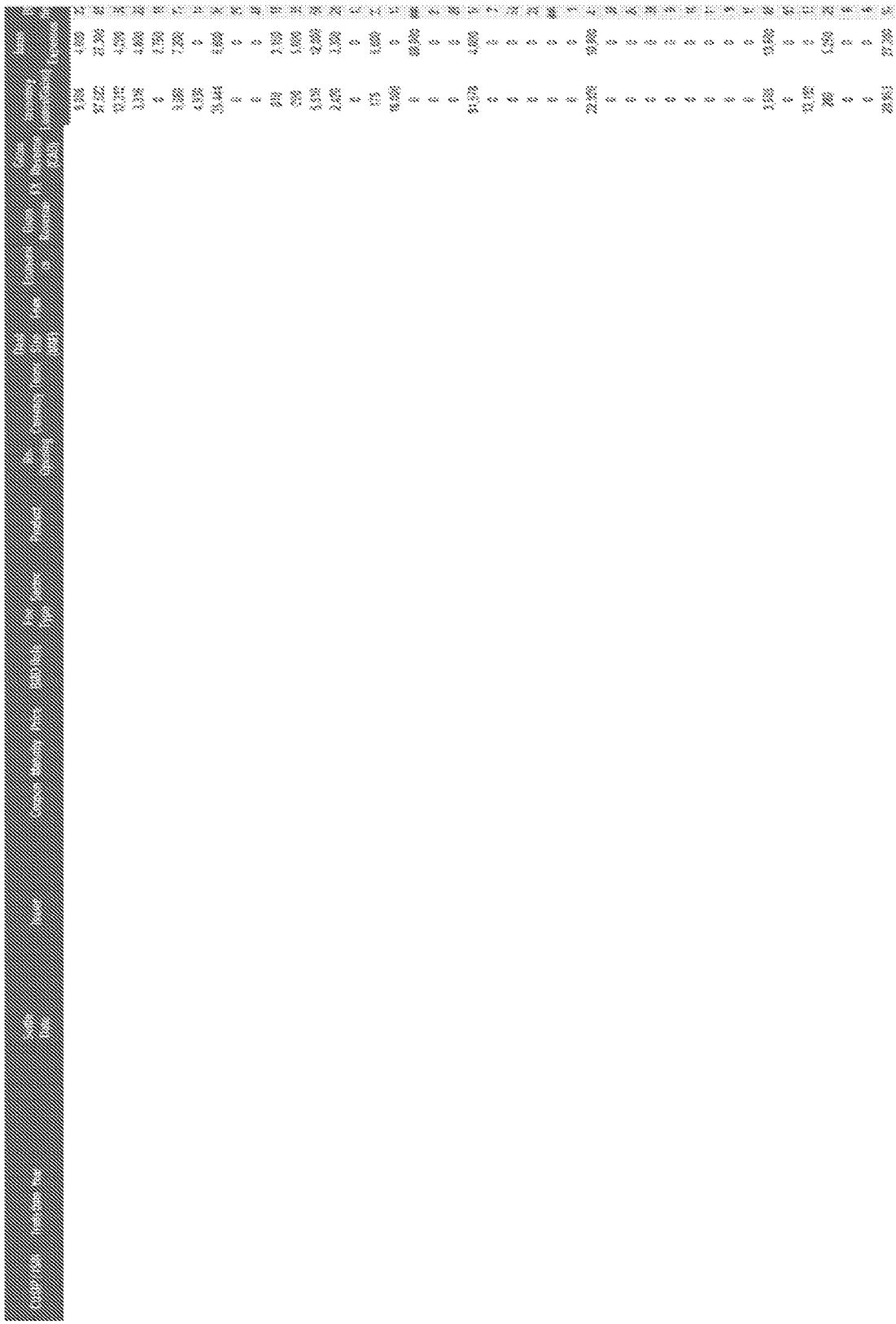
FIG. 11 is a diagram of an interface for an example management report.

FIG. 11 is a diagram of an interface for an example management report 1100.

FIG. 12 is a diagram of an interface for an example deal report 1200 that can be transmitted to the interface application as an alert with actionable items for defining parameters for a new issue.

Figure 13:
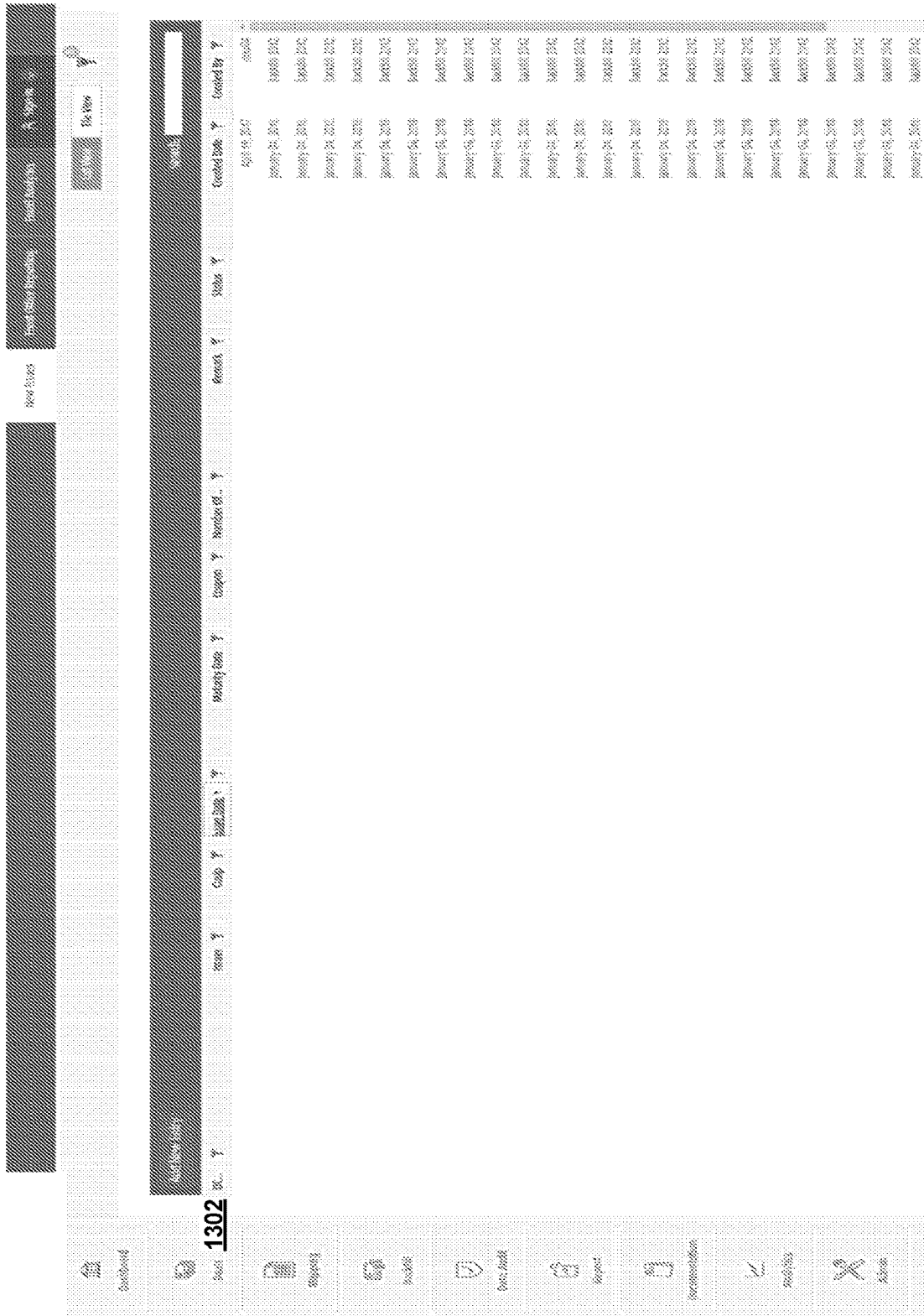
FIG. 13 is a diagram of an interface for a deal page.

FIG. 13 is a diagram of an interface for a deal page 1300. The deal page 1300 can be displayed in response to activation of a deal button 1302.

Figure 14:
FIG. 14 is a diagram of an interface for a deal page.

FIG. 14 is a diagram of an interface for a deal page 1400 displaying deal data.

FIG. 15 is a diagram of an interface for a deal entry page 1500 with different form fields for receiving data entries for different data object types to define parameters of the deal. The data entries can be automatically populated using mappings generated by mapping tool 114.

FIG. 16 is a diagram of an interface for a mapping page 1600 for displaying or defining mappings for mapping tool 114. The mapping page 1600 can be displayed in response to activation of a mapping button 1602. The mappings can relate to deal data objects or data entries. The mappings can relate to buyers or issuers and dealers. The mappings link data entries or data objects. The mapping page 1600 can include a button to add a new mapping or modify an existing mapping. The mapping page 1600 can include with different form fields for receiving data entries for different data object types to define parameters for mapping.

FIG. 17 is a diagram of an interface for a mapping page 1700 to add a new mapping. The mapping page 1700 can include with different form fields for receiving data entries for different data object types to define a new mapping.

Figure 18:
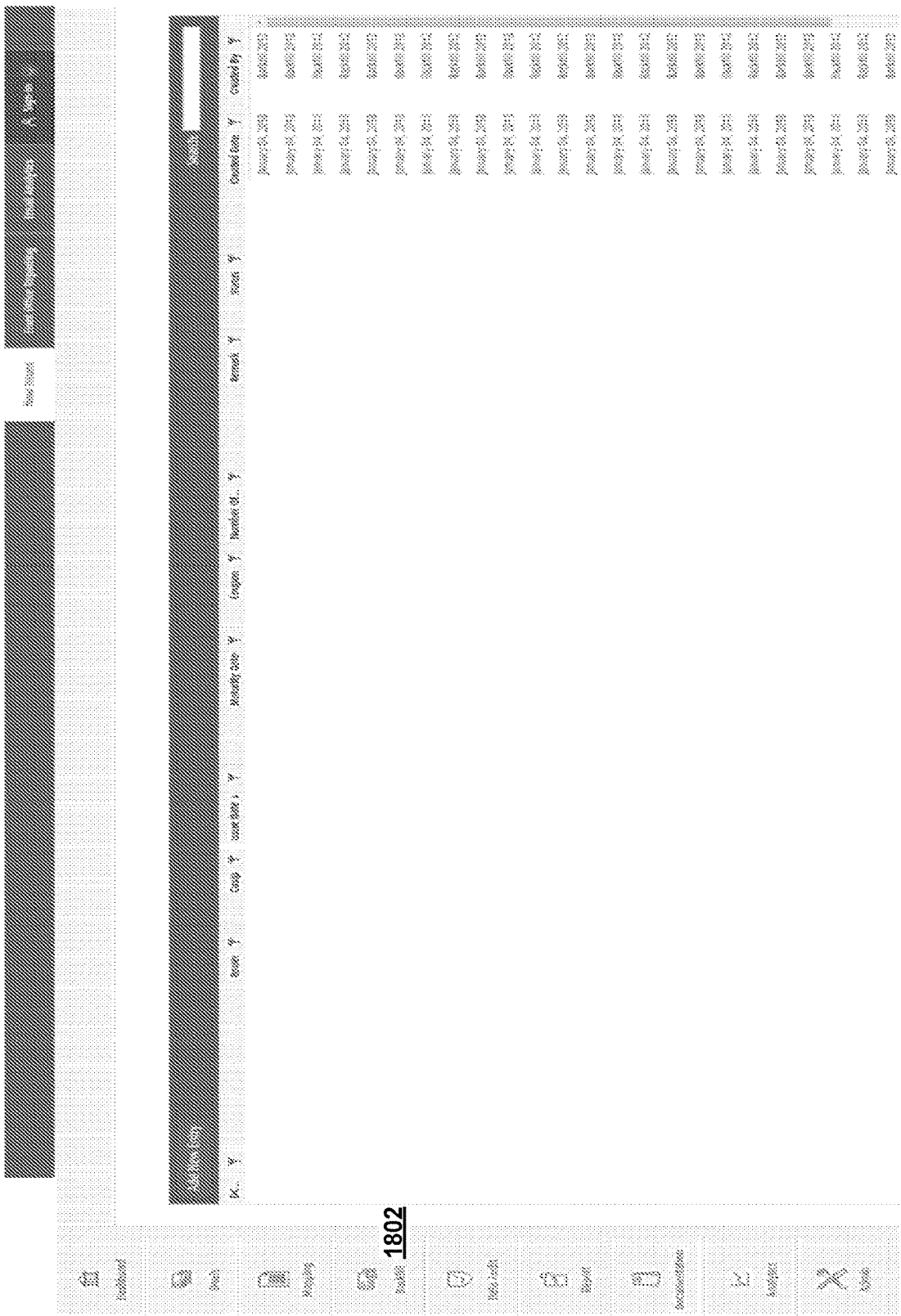
FIG. 18 is a diagram of an interface for a backfill page.

FIG. 18 is a diagram of an interface for a backfill page 1800. The backfill page 1800 can be displayed in response to activation of a backfill button 1802.

Figure 19:
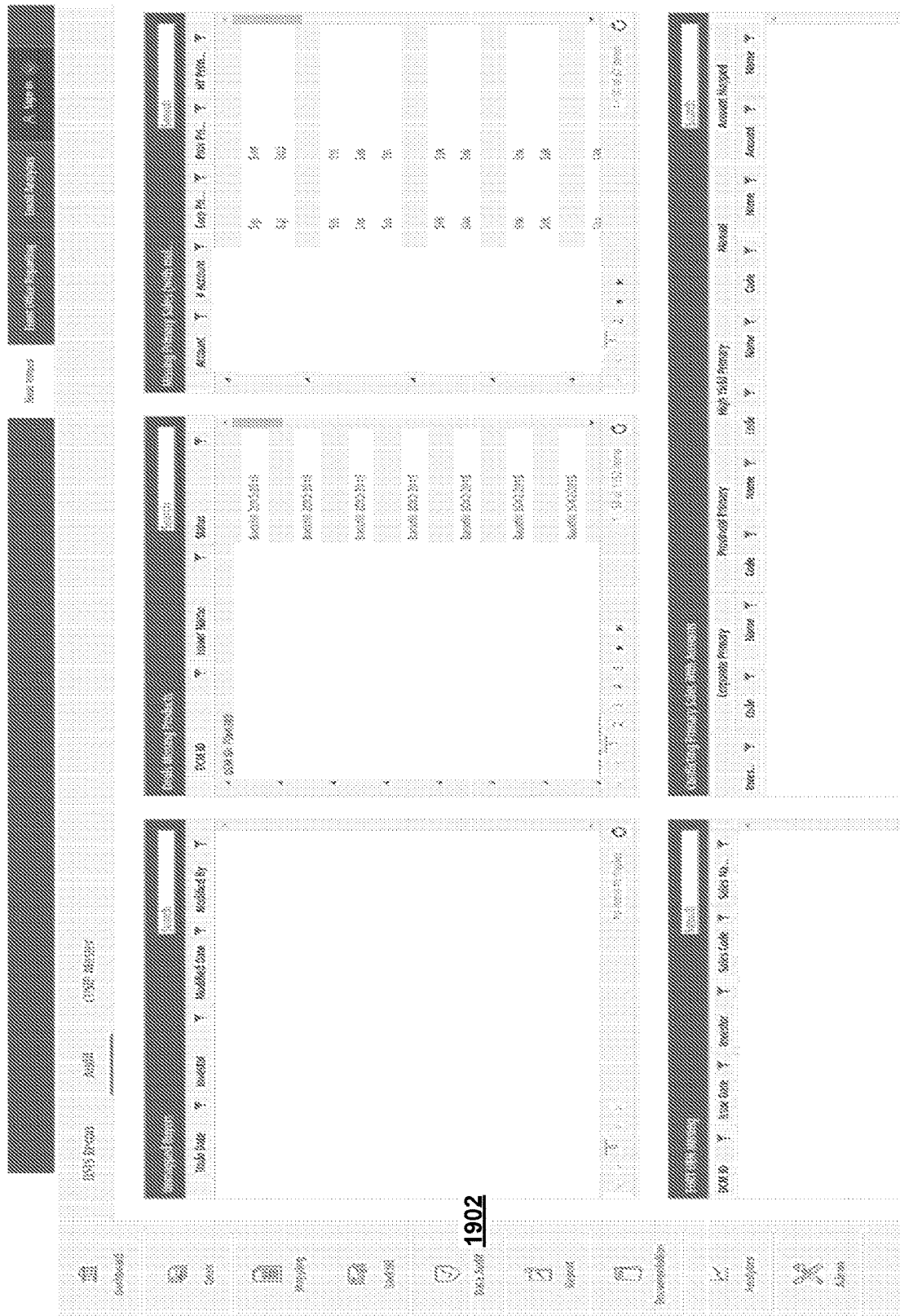
FIG. 19 is a diagram of an interface for a data audit view.

FIG. 19 is a diagram of an interface for a data audit view 1900. The data audit view 1900 can be displayed in response to activation of a backfill button 1902. The data audit view 1900 can include visual elements relating to unmapped buyers, deals missing products, missing primary sales, conflicting sales with accounts, and so on. The data audit view 1900 shows data that is flagged during the verification process.

Figure 20:
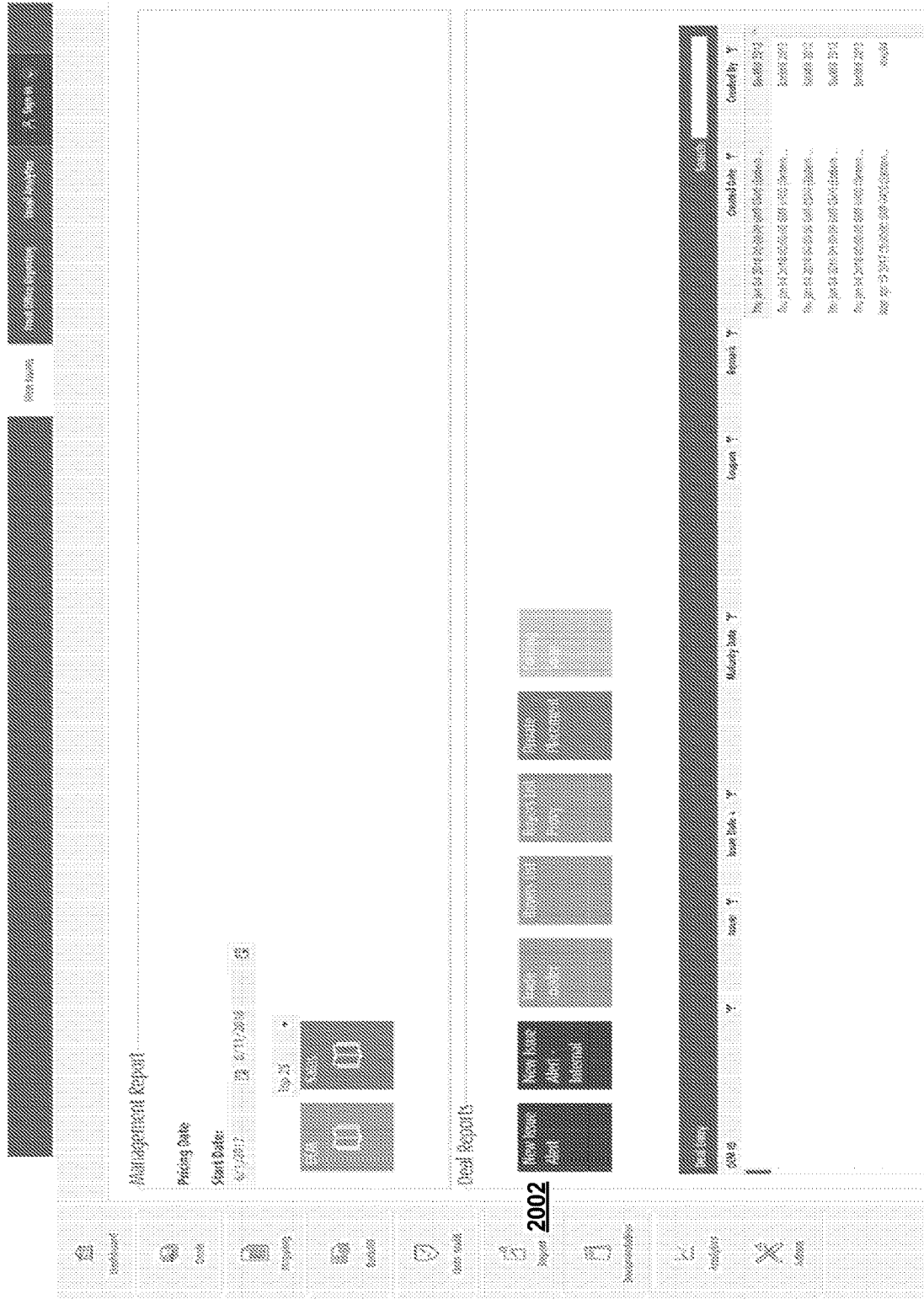
FIG. 20 is a diagram of an interface for a report view.

FIG. 20 is a diagram of an interface for a report view 2000. The report view 2000 can be displayed in response to activation of a report button 2002.

Figure 21:
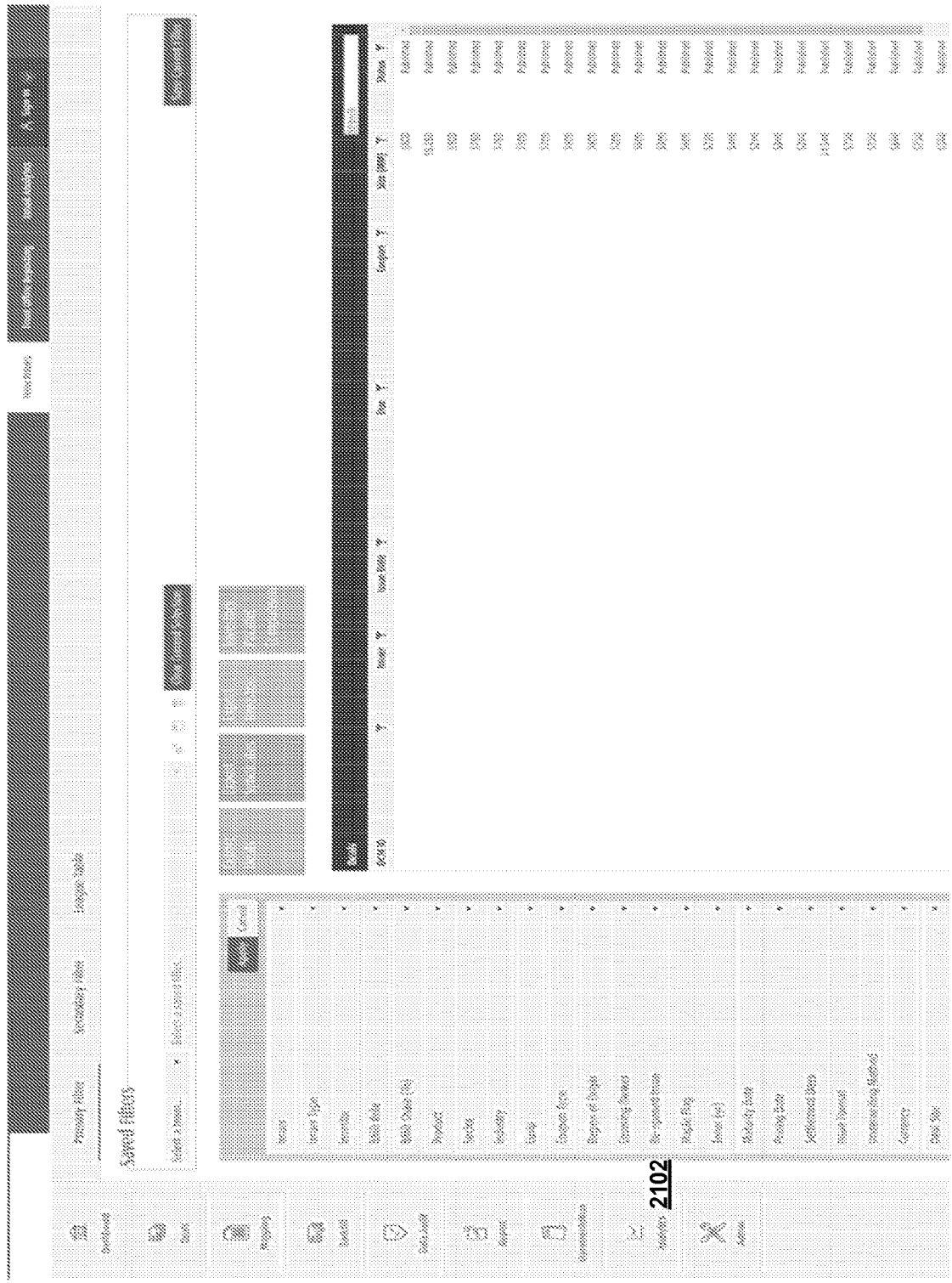
FIG. 21 is a diagram of an interface for an analytics view.

FIG. 21 is a diagram of an interface for an analytics page 2100 with filtering features and report exports. The filtering can be by different parameters, such as deals, syndicates, and investors. The analytics page 2100 can be displayed in response to activation of a analytics button 2102.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A method comprising:
   receiving, by a processor from a plurality of computing devices, input data associated with a new issuing deal;
   generating, by the processor, data entries using a mapping model, the data entries comprising at least pricing data associated with the new issuing deal;
   executing, by the processor, a machine learning model configured to determine, for each of the data entries generated, a value corresponding to a quality of information;
   generating, by the processor, a dynamic form for the new issue deal, the dynamic form having form fields automatically populated in accordance with the set of data entries of the data entries generated using the mapping model and their corresponding values predicted using the machine learning model;
   providing, by the processor, remote access by a plurality of stakeholders to the dynamic form for the new issue deal entry to receive additional data;
   in response to receiving additional data entries from at least one stakeholder:
      populating, by the processor, at least one dynamic form field with the additional data entries using the mapping model; and
      transmitting, by the processor, an update alert including a report of the additional data entries for the new issue deal entry to at least a portion of the plurality of stakeholders.

2. The method of claim 1, wherein the machine learning model is trained using updated data entries generated from the input data.

3. The method of claim 1, further comprising:
   transmitting, by the processor, a new deal alert to the plurality of stakeholders, the new deal alert indicating that a new issue deal is live.

4. The method of claim 1, further comprising:
   generating, by the processor, visual elements corresponding to data flagged during determination of the value corresponding to the quality of information.

5. The method of claim 1, further comprising:
   determining, by the processor, a list of interested buyers associated with the new issue deal.

6. The method of claim 5, further comprising:
   determining, by the processor, allotments control fills for the new issue among the list of interested buyers.

7. The method of claim 1, wherein the additional data entries indicate buyer data, and the processor is configured to generate a buyer record and update the mapping model to link the buyer record to the additional data entries.

8. The method of claim 1, the value indicates whether an input is validated, partially validated, or on validated.

9. A non-transitory computer readable medium with machine executable instructions to configure a processor to:
   receive, from a plurality of computing devices, input data associated with a new issuing deal;

generate data entries using a mapping model, the data entries comprising at least pricing data associated with the new issuing deal;

execute a machine learning model configured to determine, for each of the data entries generated, a value corresponding to a quality of information;

generate a dynamic form for the new issue deal, the dynamic form having form fields automatically populated in accordance with the set of data entries of the data entries generated using the mapping model and their corresponding values predicted using the machine learning model;

provide remote access by a plurality of stakeholders to the dynamic form for the new issue deal entry to receive additional data;

in response to receiving additional data entries from at least one stakeholder:
populate at least one dynamic form field with the additional data entries using the mapping model; and
transmit an update alert including a report of the additional data entries for the new issue deal entry to at least a portion of the plurality of stakeholders.

10. The non-transitory computer readable medium of claim 9, wherein the machine learning model is trained using updated data entries generated from the input data.

11. The non-transitory computer readable medium of claim 9, wherein the instructions cause the processor to:
transmit a new deal alert to the plurality of stakeholders, the new deal alert indicating that a new issue deal is live.

12. The non-transitory computer readable medium of claim 9, wherein the instructions cause the processor to:
generate visual elements corresponding to data flagged during determination of the value corresponding to the quality of information.

13. The non-transitory computer readable medium of claim 9, wherein the instructions cause the processor to:
determine a list of interested buyers associated with the new issue deal.

14. The non-transitory computer readable medium of claim 13, wherein the instructions cause the processor to:
determine allotments control fills for the new issue among the list of interested buyers.

15. The non-transitory computer readable medium of claim 9, wherein the additional data entries indicate buyer data, and the processor is configured to generate a buyer record and update the mapping model to link the buyer record to the additional data entries.

16. The non-transitory computer readable medium of claim 9, the value indicates whether an input is validated, partially validated, or on validated.

17. A system comprising:
data storage device storing machine executable instructions; and
a processor connected to the data storage device configured by the machine executable instructions to:
receive, from a plurality of computing devices, input data associated with a new issuing deal;
generate data entries using a mapping model, the data entries comprising at least pricing data associated with the new issuing deal;
execute a machine learning model configured to determine, for each of the data entries generated, a value corresponding to a quality of information;
generate a dynamic form for the new issue deal, the dynamic form having form fields automatically populated in accordance with the set of data entries of the data entries generated using the mapping model and their corresponding values predicted using the machine learning model;
provide remote access by a plurality of stakeholders to the dynamic form for the new issue deal entry to receive additional data;
in response to receiving additional data entries from at least one stakeholder:
populate at least one dynamic form field with the additional data entries using the mapping model; and
transmit an update alert including a report of the additional data entries for the new issue deal entry to at least a portion of the plurality of stakeholders.

18. The system of claim 17, wherein the machine learning model is trained using updated data entries generated from the input data.

19. The system of claim 17, wherein the instructions cause the processor to:
transmit a new deal alert to the plurality of stakeholders, the new deal alert indicating that a new issue deal is live.

20. The system of claim 17, wherein the instructions cause the processor to:
generate visual elements corresponding to data flagged during determination of the value corresponding to the quality of information.

* * * * *